United States Patent
Freitag et al.

(10) Patent No.: US 7,115,234 B2
(45) Date of Patent: *Oct. 3, 2006

(54) PARALLEL SEMI-CONTINUOUS OR CONTINUOUS REACTOR SYSTEM

(75) Inventors: J. Christopher Freitag, Santa Clara, CA (US); Damian Hajduk, Santa Clara, CA (US); Ralph B. Nielsen, Santa Clara, CA (US); Adam Safir, Santa Clara, CA (US); Richard Tiede, Santa Clara, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 10/315,512

(22) Filed: Dec. 9, 2002

(65) Prior Publication Data

US 2003/0125484 A1    Jul. 3, 2003

Related U.S. Application Data

(60) Continuation of application No. 09/755,388, filed on Jan. 4, 2001, now Pat. No. 6,566,461, which is a division of application No. 09/205,071, filed on Dec. 4, 1998, now Pat. No. 6,485,692.

(51) Int. Cl.
*B01J 19/00* (2006.01)

(52) U.S. Cl. ........................ 422/130; 422/99; 422/100; 422/102; 422/129; 426/174; 426/179; 426/180

(58) Field of Classification Search .......... 422/99–104, 422/129–131, 134; 436/174, 179, 180
See application file for complete search history.

(56) References Cited

U.S. PATENT DOCUMENTS 4,000,976 A    1/1977   Kramer et al.

(Continued)

FOREIGN PATENT DOCUMENTS

DE            19652327         6/1998

(Continued)

OTHER PUBLICATIONS

Kiezel et al., Chemia Stosowana [Applied Chemistry] XIL JA 107, *Comparative Semi-Micromethod of Studying Catalyst Activity*, Mar. 15, 1967, pp. 407-415; (with translation).

(Continued)

*Primary Examiner*—Jill Warden
*Assistant Examiner*—Dwayne K Handy
(74) *Attorney, Agent, or Firm*—Senniger Powers

(57) ABSTRACT

A method and apparatus for reacting a plurality of different mixtures in parallel in a semi-batch or continuous mode is provided. Each reaction is contained within a reactor vessel, the reactor vessels combined into a reactor block. Reactant(s) to be added during the reaction are kept in a header barrel, which has a plunger to feed reactant(s) from the header barrel through a transfer line into the reactor vessel. The plunger is moved using a drive system. The header barrels are optionally combined in a header block. The header block is sealed to a plate containing the transfer lines, which in turn is sealed to the reactor block. A latch mechanism is provided for easy sealing of the reactor and header blocks to the plate. The entire apparatus may be placed on a rocker or rotating plate for mixture as the reaction is proceeding.

18 Claims, 22 Drawing Sheets

U.S. PATENT DOCUMENTS

| | | | |
|---|---|---|---|
| 4,099,923 | A | 7/1978 | Milberger |
| 4,676,951 | A | 6/1987 | Armes et al. |
| 4,944,923 | A | 7/1990 | Heinrichs et al. |
| 5,603,351 | A | 2/1997 | Cherukuri et al. |
| 5,746,982 | A | 5/1998 | Saneii et al. |
| 5,792,430 | A | 8/1998 | Hamper |
| 5,792,431 | A | 8/1998 | Moore et al. |
| 5,837,199 | A | 11/1998 | Dumschat |
| 5,866,342 | A | 2/1999 | Antonenko et al. |
| 5,869,643 | A | 2/1999 | Chatelain et al. |
| 5,888,830 | A | 3/1999 | Mohan et al. |
| 6,036,923 | A | 3/2000 | Laugharn, Jr. et al. |
| 6,045,755 | A | 4/2000 | Lebl et al. |
| 6,106,784 | A * | 8/2000 | Lund et al. .................. 422/104 |
| 6,126,904 | A * | 10/2000 | Zuellig et al. .............. 422/130 |
| 6,149,882 | A | 11/2000 | Guan et al. |
| 6,159,368 | A | 12/2000 | Moring et al. |
| 6,323,035 | B1 * | 11/2001 | Kedar et al. .................. 436/43 |
| 6,416,714 | B1 * | 7/2002 | Nova et al. ................ 422/68.1 |

FOREIGN PATENT DOCUMENTS

| | | |
|---|---|---|
| EP | 0 529 504 A2 | 3/1993 |
| EP | 0 658 566 A1 | 6/1995 |
| EP | 0 963 791 A2 | 12/1999 |
| WO | WO 90/02605 | 3/1990 |
| WO | WO 93/20130 | 10/1993 |
| WO | WO 96/11878 | 4/1996 |
| WO | WO 97/10896 | 3/1997 |
| WO | WO 97/14041 | 4/1997 |
| WO | WO 97/32208 | 9/1997 |
| WO | WO 97/45443 | 12/1997 |
| WO | WO 98/13137 | 4/1998 |
| WO | WO 98/22212 | 5/1998 |
| WO | WO 98/36826 | 8/1998 |
| WO | WO 98/40159 | 9/1998 |
| WO | WO 98/57740 | 12/1998 |
| WO | WO 99/30817 | 6/1999 |

OTHER PUBLICATIONS

SGE, Inc., *Pluger-in-Needle Array Syringes*, Product Data Sheet, 2 pages.

Chem.-ing. Tech., *New Wilden Diaphragm*, 1980, 1 pg., Nova Werke AG, Switzerland. (Translation).

Nova Swiss, *Fast Results for Individual and Series of Tests under Pressure and at Elevated Temperature witH The Novaswiss High Pressure Laboratory*, 4 pp., Nova-Werke Deutschland GmbH, Germany. (Translation).

Parr, *Stirred Reactor and Pressure Vessels*, 1994, 106 pp., Parr Instrument Company, Moline, Illinois, United States.

* cited by examiner

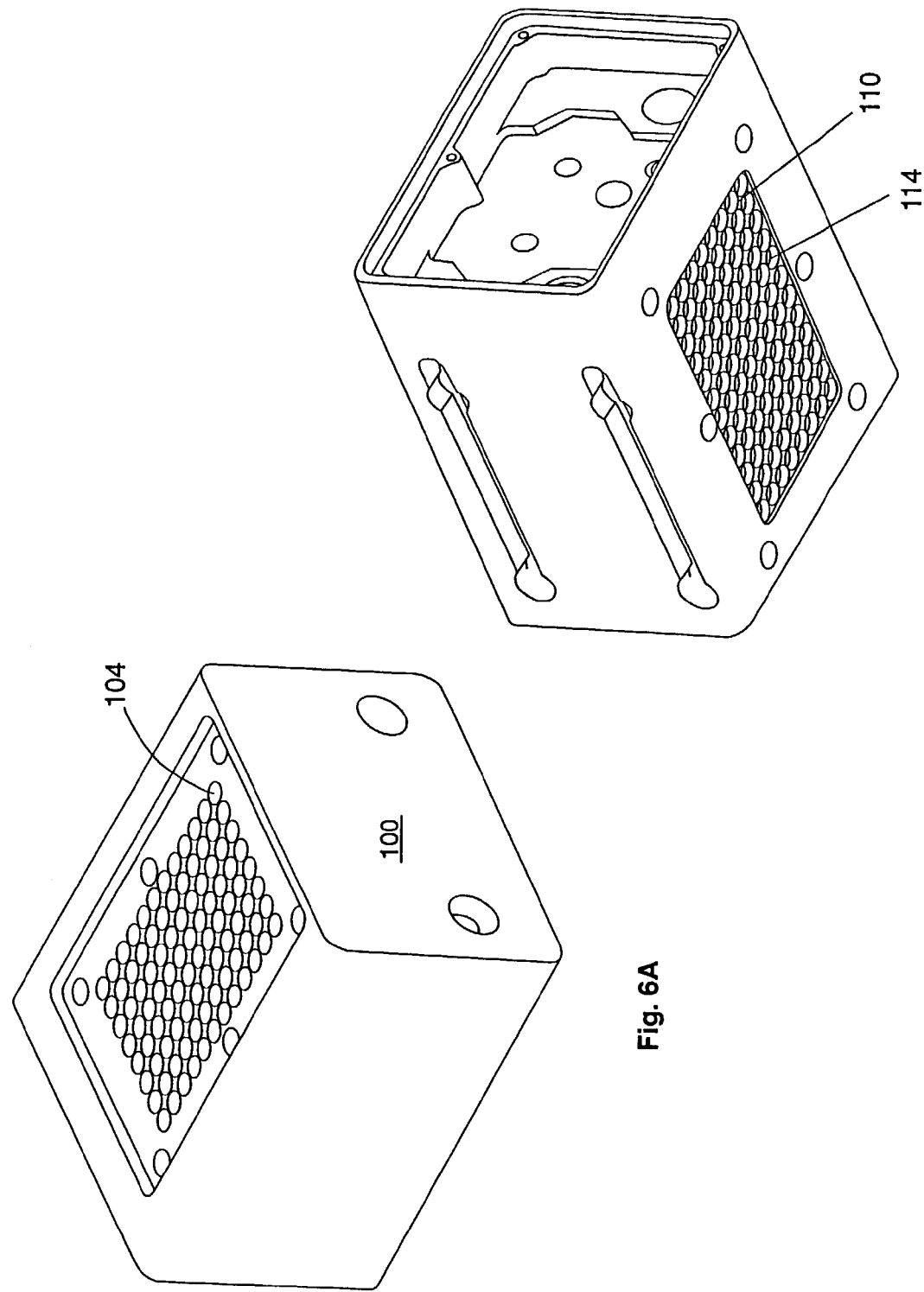

PARALLEL SEMI-CONTINUOUS OR CONTINUOUS REACTOR SYSTEM

This application is a continuation of U.S. Ser. No. 09/755,388, filed Jan. 4, 2001 now U.S. Pat. No. 6,566,461, which is a divisional of U.S. Ser. No. 09/205,071 filed Dec. 4, 1998 and issued as U.S. Pat. No. 6,485,692, both of which are incorporated herein by reference, the teachings of which are incorporated herein by reference.

BACKGROUND

1. Technical Field

The present invention relates to a method and apparatus for rapidly making, screening, and characterizing an array of materials in which process conditions are controlled and monitored, and in particular where the feed to each reactor vessel is continuously fed.

2. Discussion

Combinatorial materials science generally refers to methods for creating a collection of diverse compounds or materials using a relatively small set of precursors and/or methods for rapidly testing or screening the collection of compounds or materials for desirable performance characteristics and properties. As currently practiced, combinatorial materials science permits scientists to systematically explore the influence of structural variations in candidates by dramatically accelerating the rates at which they are created and evaluated. Compared to traditional discovery methods, combinatorial methods sharply reduce the costs associated with preparing and screening each candidate.

Combinatorial chemistry has revolutionized the process of drug discovery. See, for example, 29 *Acc. Chem. Res.* 1–170 (1996); 97 *Chem. Rev.* 349–509 (1997); S. Borman, *Chem. Eng. News* 43–62 (Feb. 24, 1997); A. M. Thayer, *Chem. Eng. News* 57–64 (Feb. 12, 1996); N. Terret, 1 *Drug Discovery Today* 402 (1996)). One can view drug discovery as a two-step process: acquiring candidate compounds through laboratory synthesis or through natural product collection, followed by evaluation or screening for efficacy. Pharmaceutical researchers have long used high-throughput screening (HTS) protocols to rapidly evaluate the therapeutic value of natural products and libraries of compounds synthesized and cataloged over many years. However, compared to HTS protocols, chemical synthesis has historically been a slow, arduous process. With the advent of combinatorial methods, scientists can now create large libraries of organic molecules at a pace on par with HTS protocols.

Recently, combinatorial approaches have been used for discovery programs unrelated to drugs. For example, some researchers have recognized that combinatorial strategies also offer promise for the discovery of inorganic compounds such as high-temperature superconductors, magnetoresistive materials, luminescent materials, and catalytic materials. See, for example, U.S. Pat. No. 5,776,359, as well as U.S. patent application Ser. No. 08/327,513 "The Combinatorial Synthesis of Novel Materials" (published as WO 96/11878) and co-pending U.S. patent application Ser. No. 08/898,715 "Combinatorial Synthesis and Analysis of Organometallic Compounds and Catalysts" (published as WO 98/03251), which are each herein incorporated by reference.

Because of its success in eliminating the synthesis bottleneck in drug discovery, many researchers have come to narrowly view combinatorial methods as tools for creating structural diversity. Few researchers have emphasized that, during synthesis, variations in temperature, pressure and other process conditions can strongly influence the properties of library members. For instance, reaction conditions are particularly important in formulation chemistry, where one combines a set of components under different reaction conditions or concentrations to determine their influence on product properties. Moreover, it is often beneficial to mimic industrial processes that are different than in pharmaceutical research so that many workers have failed to realize that processes often can be used to distinguish among library members. Some parallel reactors are known; see for example WO 98/36826 and U.S. Pat. Nos. 4,099,923 and 4,944,923, that are each incorporated herein by reference. However, what is needed is an apparatus for preparing and screening combinatorial libraries in which an industrial process can be followed.

SUMMARY OF THE INVENTION

The present invention provides a method and apparatus for reacting a plurality of different mixtures in parallel where one or more reactants are constantly fed to a plurality of reaction vessels from one or more sources. The present invention provides a method and apparatus for semi-continuous processes, in which one or more reagents is fed into the reactor from a source or header vessel. The present invention also provides a method and apparatus for continuous processes, in which product is simultaneously removed from the reactor as reagents are fed into the reactor. In addition to control of the reactants, catalysts, initiators, solvents, etc. chosen for a particular reaction, certain reaction conditions can be controlled including temperature, pressure, mixing, rate of reactant addition and/or rate of product removal.

Broadly, each reaction is contained within a reactor vessel, with a plurality of reactor vessels optionally being combined into a single parallel reactor block. Associated with each reactor vessel is one or more reactant sources (called "header barrels") that provide one or more reactants that are fed into the reactor. A plurality of sources or header barrels can be provided in a header block. The header barrel is connected to the reactor vessels via a transfer line. A transfer system feeds reactant from the header barrel, through the transfer line and into the reactor vessel, optionally while the contents of the reactor are being mixed. The transfer system may comprise a pump or a plunger. The reactor vessel is typically sealed to the outside except for the connection to the transfer line, and methods of sealing are provided. In some embodiments, the entire system is sized to allow for the reactors, headers, plungers and drive system to fit into an inert atmosphere glove box, appropriate for air and moisture sensitive reactions.

In a much more specific embodiment, a 96-cell semi-continuous parallel reactor block is provided. Ideally, each vessel may be located at standard microtiter plate spacing. A separate header barrel is used for each reactor vessel and 96 header barrels are disposed in a header block. The reactor vessels within the reactor block are disposable glass vials, and the header barrels within the header block are glass syringes. The blocks and hence the reactor vessels are connected together with an inert orifice, which is the transfer line and also serves to thermally insulate the vessel from the barrel, as well as prevent undesired mixing of the contents of the two vessels. In this specific embodiment, the reactor vessel is constant volume, initially filled only partially with liquid, leaving a compressible gas headspace in the vessel. The header barrel's volume is decreased throughout the reaction as the contents of the header are injected into the reactor, causing the pressure of the system gradually increase. Additional pressure rise is caused as the reactor vessels are heated, potentially above the boiling point of the liquids inside. Filling and assembly of the reactor/header reaction system may done in two halves, first by filling the reactor vessels to a desired amount and then filling the header barrels to a desired amount. The tops of the reactor vessels and header barrels are held in an array format by a collar, which leaves a portion of the bottom of each reactor vessel exposed. The reactor vessels are filled with different mixtures via a fluid-handling robot or manually. The collar is used to move all reactor vessels from a filling station into the reactor block at once. This allows the filling station to be independent of the reactor block, and also allows automated robotic handling and transfer of the reactors from one station to another. The header barrels are open at the end opposite the plunger rod. This allows the headers to be filled by direct dispensing (manual or automated), rather than by aspiration from another container. This ensures that the header vessel mixture is not altered in the event that the mixture is non-homogeneous. This open-end design also allows addition of mixing balls into the header, and reduces entrapment of gasses. Once the headers are filled, a plate containing individual orifices at each vessel position seals the entire array at once. The header barrels may be inverted and attached onto the reactor vessels. The orifices keep the header contents from spilling during the inversion, and are sized to keep the fluid velocity during injection much higher than the diffusion rate, keeping the contents of the header vessel separated from the reactor vessels during a reaction.

Heating of the reactor vessels and/or header barrels may be accomplished in many different ways. In the most specific embodiment, cartridge heaters mounted into the reactor block provide heating. Heat is conducted to the vessels axially through the block, then radially into the vessel. A temperature sensor is also mounted into the block to provide feedback for a closed-loop temperature controller. The same heating may be used in the header block.

In the preferred embodiment, sealing is accomplished by pressing the lip of the reactor vessel against a seal associated with a plate between the header and reactor blocks. However, a variety of sealing options are presented. Preferably, sealing is accomplished while accounting for a possible variation in the height of the reactor vessels, which may be removable vessels in wells of the reactor block. Thus, preferably both the reactor vessels and the header vessels are independently supported by a preloaded spring. This applies a virtually constant level of compression force during axial dimensional changes, caused by vial height variations, seal compression set, differential thermal expansion of components, etc. A latch mechanism is also preferably used that translates a single input motion to two counter-rotating drums, which pull the plate carrying the orifices orthogonally onto the vessel lips without tilting. This mechanism may be actuated either manually, or automatically.

Mixing is optional, but may be accomplished by placing the entire reactor on a rocking platform, which allows mixing balls in each reactor vessel to tumble through the fluids, being pulled by gravity. Uniform stirring of all of the reactions can be obtained, which insures that any differences noted between reactions are not artifacts of the manner in which the samples were mixed. Alternative embodiments include use of stirring bars (either magnetic or mechanical) or mechanical stirring.

A further understanding of the nature and advantages of the present invention may be realized by reference to the remaining portions of the specification and the drawings.

BRIEF DESCRIPTION OF THE DRAWINGS

FIG. 6 shows a top and bottom view of the header block, which holds the glass syringes in the preferred embodiment.

DETAILED DESCRIPTION OF THE PREFERRED EMBODIMENTS

The present invention provides an apparatus and method for carrying out multiple reactions in parallel. It is especially useful for synthesizing and/or screening combinatorial libraries. The term "header barrel" is used to describe the container that holds the one or more reactants that are fed into the reactor from the sources in the header. The term "barrel" is not intended to be limiting and a header barrel can take any convenient form including a vessel, tank, barrel, pipe, vial, syringe or other form of container. Also, the phrase "storage tank" is used to describe the container that holds the material that exits the reactor. The term "tank" is not intended to be limiting and a storage tank can take any convenient form including a vessel, tank, barrel, pipe, vial, syringe or other form of container.

Figure 1:
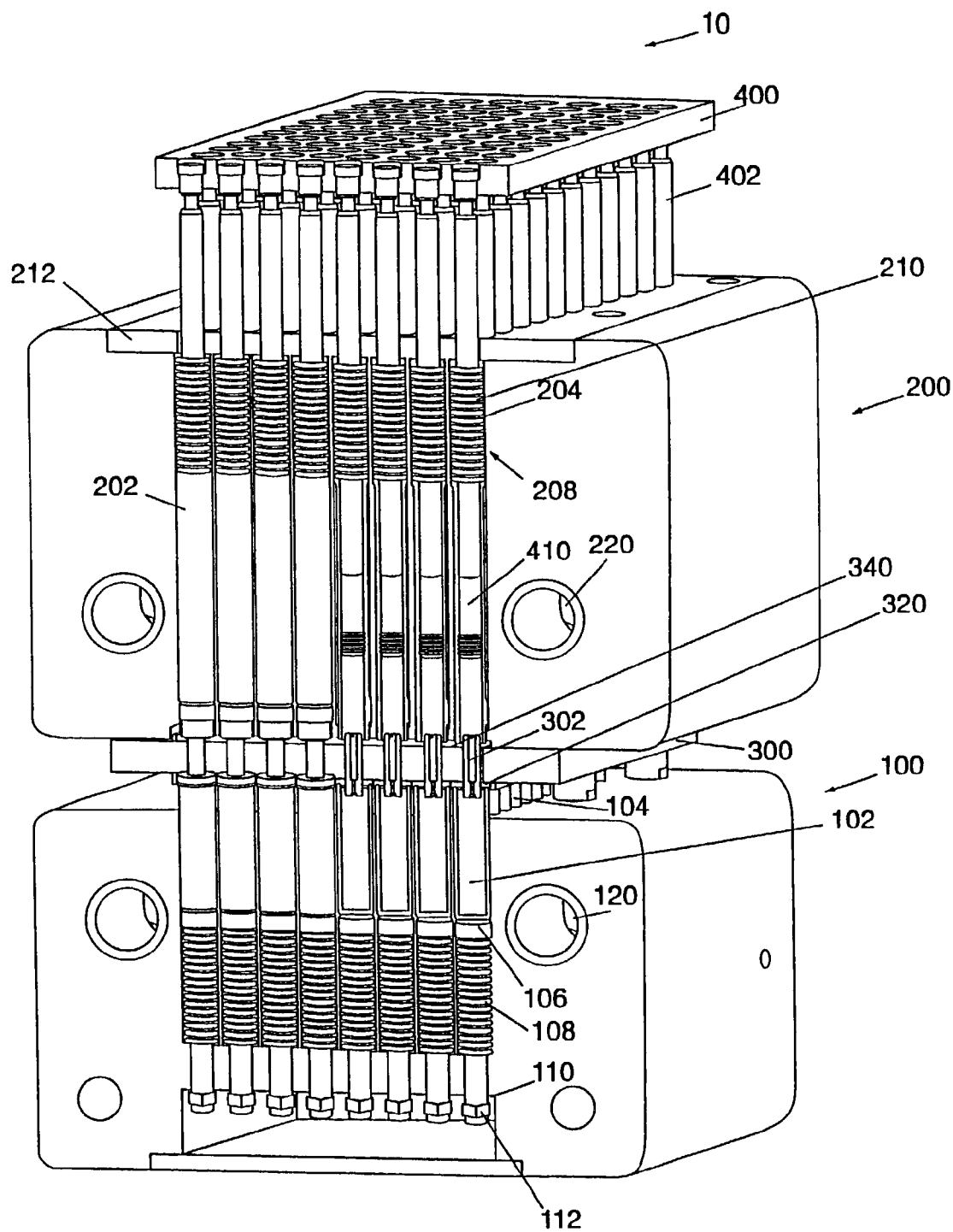
FIG. 1 illustrates a parallel reactor system in accordance with the present invention.

FIG. 1 shows a constant volume embodiment of a parallel reactor system 10. The system 10 comprises a reactor block 100 and a header block 200 having sandwiched between them a plate 300 that holds the transfer lines 302 allowing for fluid communication between the reactors 102 in the reactor block 100 and the header barrels 202 in the header block 200. There are also two seals associated with the plate 300, a reactor seal 320 and a header seal 340. The system 10 additionally comprises a plunger plate 400 for pressing on plungers 402 that form the top of the header barrels 202 to feed reactant(s) through the transfer line 302 into the reactor vessels 102. The system additionally comprises a drive system (not shown in FIG. 1) for driving the plungers (i.e., the plunger plate).

To perform parallel semi-batch reactions, reactants, catalysts, initiators, solvents, scavengers, etc. are loaded into the reactor vessels 102 leaving some headspace. Reactant(s) to be added to the reactor vessel 102 during the reaction is loaded into the header barrels 202 at the opposite end from the plungers 402. The vessels 102 are placed in the wells 104 of the reactor block 100. The plate 300 comprising the transfer lines 302 and the seals 320 & 340 is then secured to the header block so that a single transfer line 302 communicates with a single header barrel 202 and so that each header barrel is sealed to the outside except for the transfer line. The plate is also secured to the reactor block 100 so that a single transfer line 302 communicates with a single reactor vessel 102 and so that each reactor vessel 102 is sealed to the outside except for the transfer line. The reaction may begin when all the components are added, but preferably the reaction beginning is controlled, for example by supplying heat to the reaction vessels via a temperature control system 900 in the reactor block (which is discussed below). The drive system forces the plungers down thereby feeding reactant(s) into the reaction vessel from the header barrel. This compresses the contents in the reactor vessels. Sufficient headspace in the reactor vessels allows that gas to compress with the pressure increase in the system is easily withstood by the sealing means. The reactions may be mixed by the addition of mixing ball to each reactor vessel and placing the entire system 10 on a rocker platform, which allows the mixing balls to tumble through the contents of the reactor.

The transfer means (described herein—e.g., pumps, plungers, etc.), for transferring the liquid reactant(s) from the header barrel(s) to the reactor vessels, can be controlled so that a desired rate of reactant feed into the reactor vessels is met. In some embodiments, the motor is controlled so that the drive system drives the plungers down feeding at a desired volume per unit time. In other embodiments, the reactants are fed into the reactor so that the time required for substantially complete feeding of the reactant(s) into the reactor from the header is on the time frame of typical industrial processes. This time is in the range of from about 0.5 hours to about 24 hours, preferably in the range of from 1–12 hours. Overall, the kinetics of the chemistry is used to select the desired feed rate, with fast chemistry allowing for faster feed rates and vice versa. Thus, the feed time may be in the range of from about 1 minute to about 48 hours.

Figure 2:
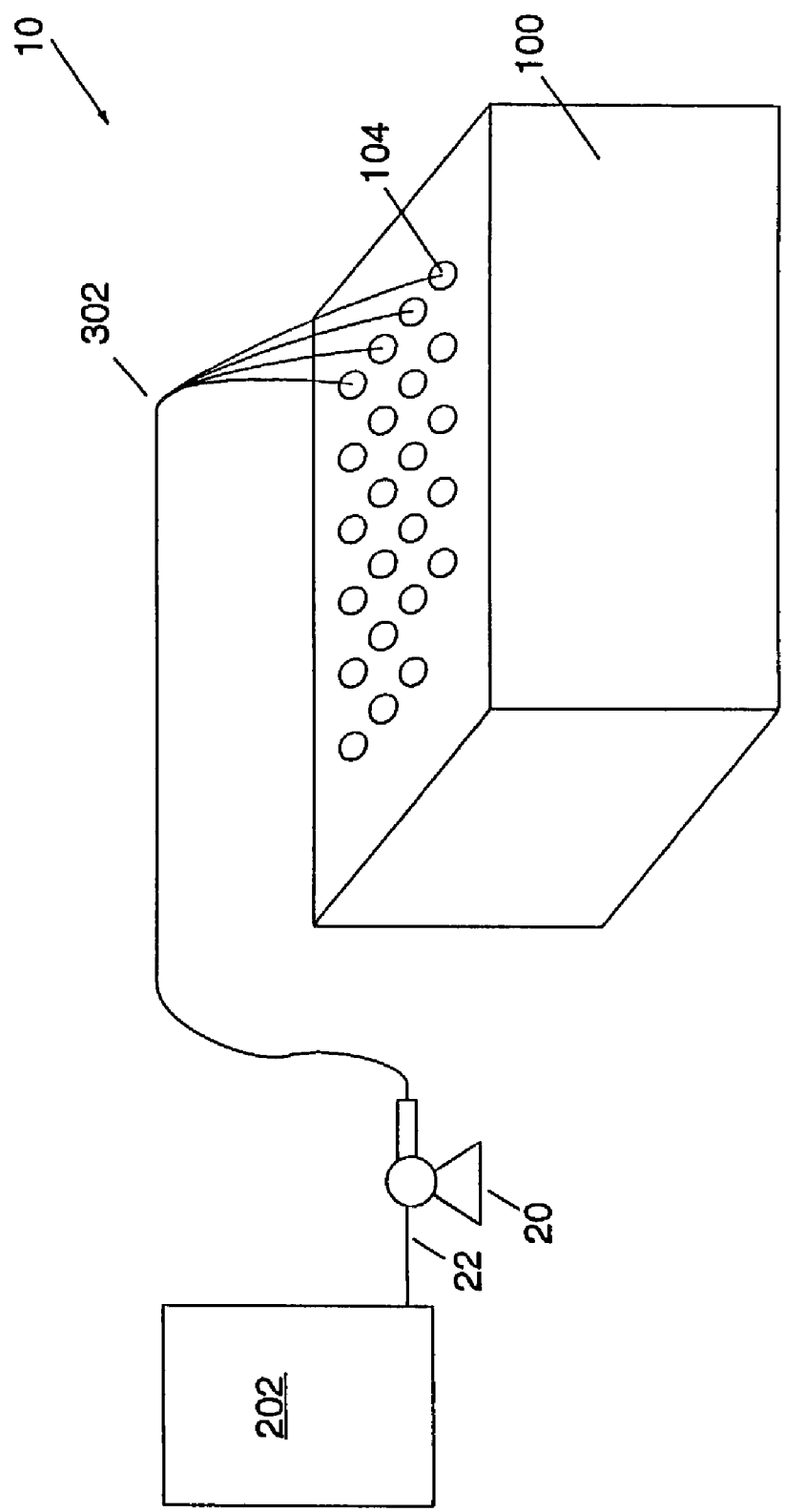
FIG. 2 illustrates an alternative embodiment parallel reactor system in accordance with the present invention.

An alternative embodiment is shown in FIG. 2, where the reactor system 10 comprises a reactor block 100 having a plurality of reactor wells 104. A transfer line 302 allows for fluid communication between a pump 20 and each well 104. The pump 20 has a feed line 22 for obtaining reactant from the header barrel 202. In this embodiment, the reactor vessels are individually sealable (e.g., with a screw cap or other sealing means) to allow for a constant volume reaction. A check valve may be added to avoid back diffusion into the transfer line. In this embodiment the method of feeding the reactant(s) into the reactor is a pump. There may be more than one pump, e.g., 2, 3 or more pumps, up to the number of reactors. Suitable pumps include syringe pumps and gear pumps. Alternatively, a plate (not shown) can connect the transfer lines 302 to each reactor vessel as well as seal each reactor vessel. A plate 300 such as discussed below could be used for this purpose. Another alternative is to provide valves in the transfer lines 302, to prevent reverse flow of reagents from the reactor to the header, or to direct flow from the header barrel in a rapid serial fashion to each of the reactor vessels, using a single flow meter or pump.

Figure 3:
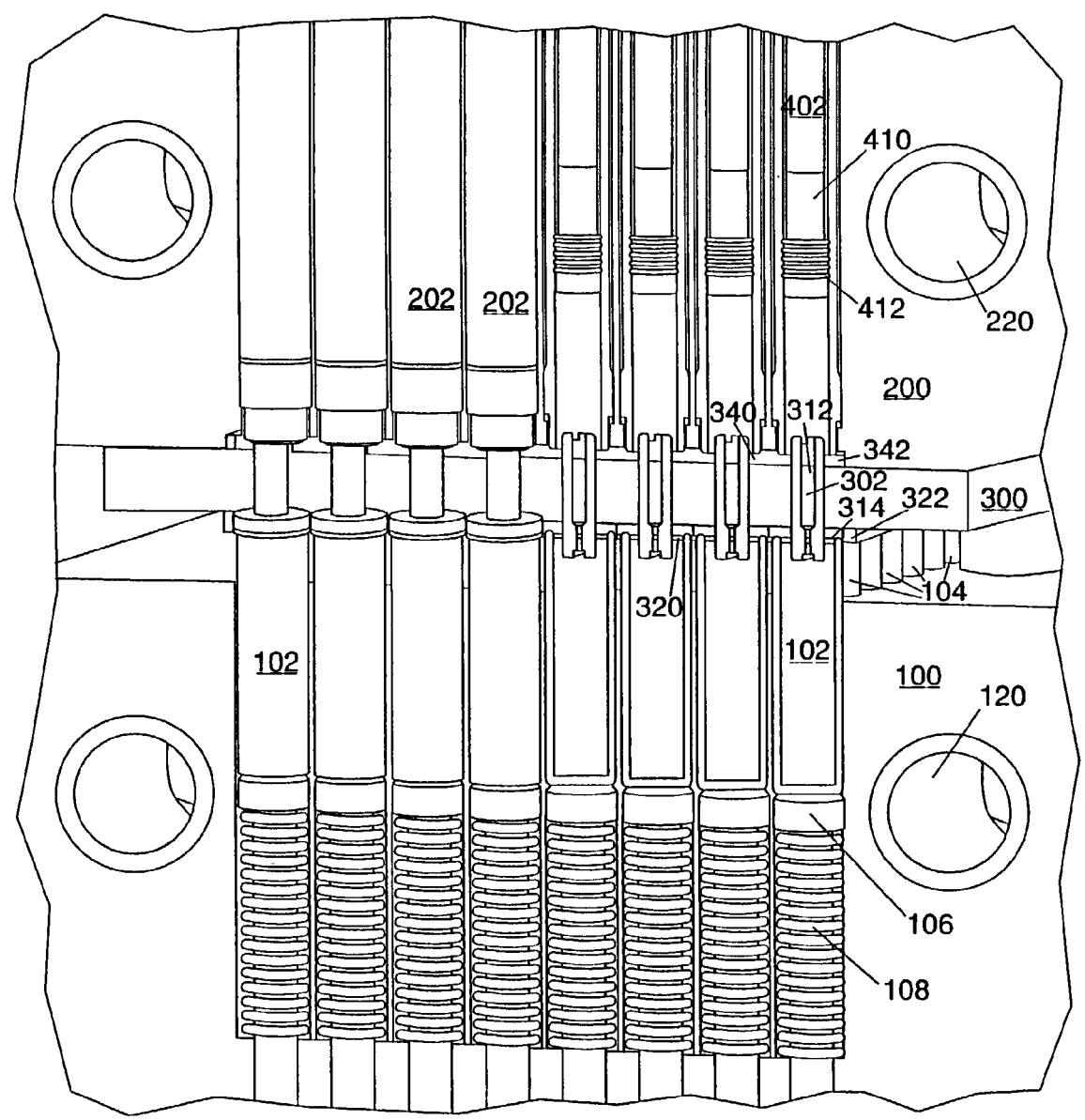
FIG. 3 shows a detailed cutaway section of the preferred reactor block, plate and header block assembly.

A preferred reactor block 100 is shown in a cutaway view in detail in FIG. 3. The reactor block 100 includes removable vessels 102 for receiving reactants, catalysts, initiators, solvents, etc. Wells 104 formed into a reactor block 100 contain the vessels 102. The wells 104 can serve as reactor vessels, in one embodiment, with the wells being disposed in the reactor block. In a preferred embodiment, removable vessels 102 are used inside the wells because of several advantages. For example, following reaction and preliminary testing (e.g., screening), one can remove a subset of vessels 102 from the reactor block 106 for further in-depth characterization. When using removable vessels 102, one can also select vessels 102 made of material appropriate for a given set of reactants, products, and reaction conditions. Unlike the reactor block 106, which represents a significant investment, the vessels 102 can be discarded if damaged after use. Finally, one can lower system 10 costs and ensure compatibility with standardized sample preparation and testing equipment by designing the reactor block 100 to accommodate commercially available vessels. The removable reactor vessels 104 can be made of any appropriate material that is inert to the reaction being conducted, including plastic, glass, etc. Preferably, the reactor vessels are glass because glass vessels of varying size and shape are commercially available and amenable to various sealing methods. The vessels 104 are shown as cylindrical in shape, but any convenient shape can be employed, including square, rectangular, etc.

Figure 5:
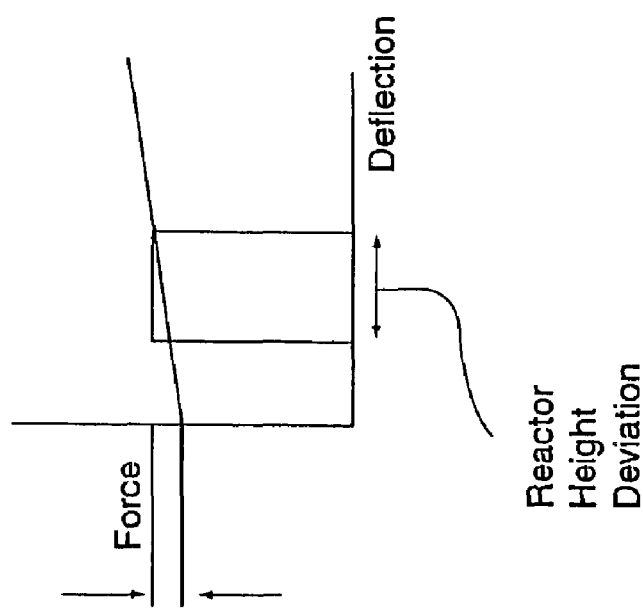
FIG. 5 shows the force vs. deflection curve for a preloaded linear spring used in the preferred embodiment.
Figure 4:
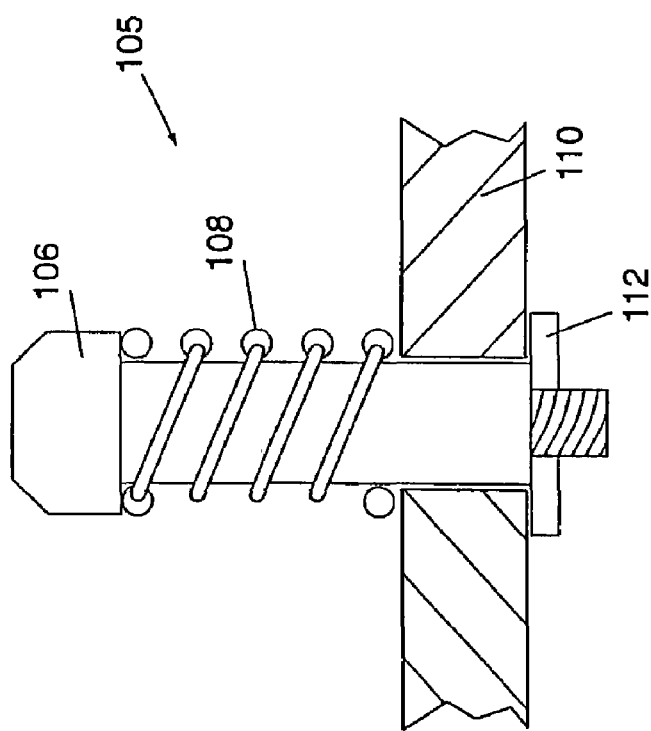
FIG. 4 shows a detail of the preferred embodiment for supporting the bottom of the reactor wells.

As shown in FIG. 3, each of the removable vessels 102 preferably contacts the bottom of the well 104. In a preferred embodiment, the bottom of the well 104 is the top of a spring pre-tensioner 106 that is surrounded by a spring 108 and bolted to the bottom 110 of the reactor block 100 with a nut 112. A detail of this reactor spring 105 assembly is shown in FIG. 4. The spring 108 is preloaded with a desired amount of compression. There are two related functions this assembly performs: (1) allowing for consistent sealing of a plurality of reactor vessels and (2) accounting for variances in the height of the reactor vessels. As shown in FIG. 3, the bottom of the reactor vessels 102 contact the top of the spring pre-tensioners 106. The top of the reactor vessels 102 contacts a reactor seal 320 associated with the plate 300, which is discussed in detail below. As the plate 300 is secured to the reactor block 100 the spring 106 provides the force to seal the reactor to the reactor seal 320. The amount of compression in the spring and the stiffness of the spring determine the amount of force pressing the top of the reactor vessel into the reactor seal. FIG. 5 is a graph showing a preferred method in which a particular spring at a particular preload changes the sealing force very little over a limited deflection, accounting for variations in reactor vessel height, and accounting for differential thermal expansion. Therefore, different spring tensions allow for different pressures. The pressure in the reactor vessel can thus be adjusted for a particular reaction. The reaction pressure can vary from atmospheric to about 1000 psi. It is possible to have a negative pressure in the system, for example by loading heated starting materials or reactant(s) followed by sealing the system and then cooling or for example by removing contents from the reactor without adding reactants from the header (in the continuous embodiment discussed below).

Also, the reactor spring assembly 105 allows for a variation in height in the reactor vessels with maintaining the same amount of pressure in each reactor. Because commercially available replacement reactor vessels have some height variation, this system accounts for that variation. Although this preferred embodiment employs a single spring for each well, in other embodiments, a single spring can be used for a plurality of reactor wells and vessels. A possible disadvantage is that sealing may not be sufficient; however, the number of wells, the uniformity of the vessels as well as the reaction being studied (e.g., a low-pressure reaction) may allow for a single spring system to sufficiently seal the reactors.

Figure 7:
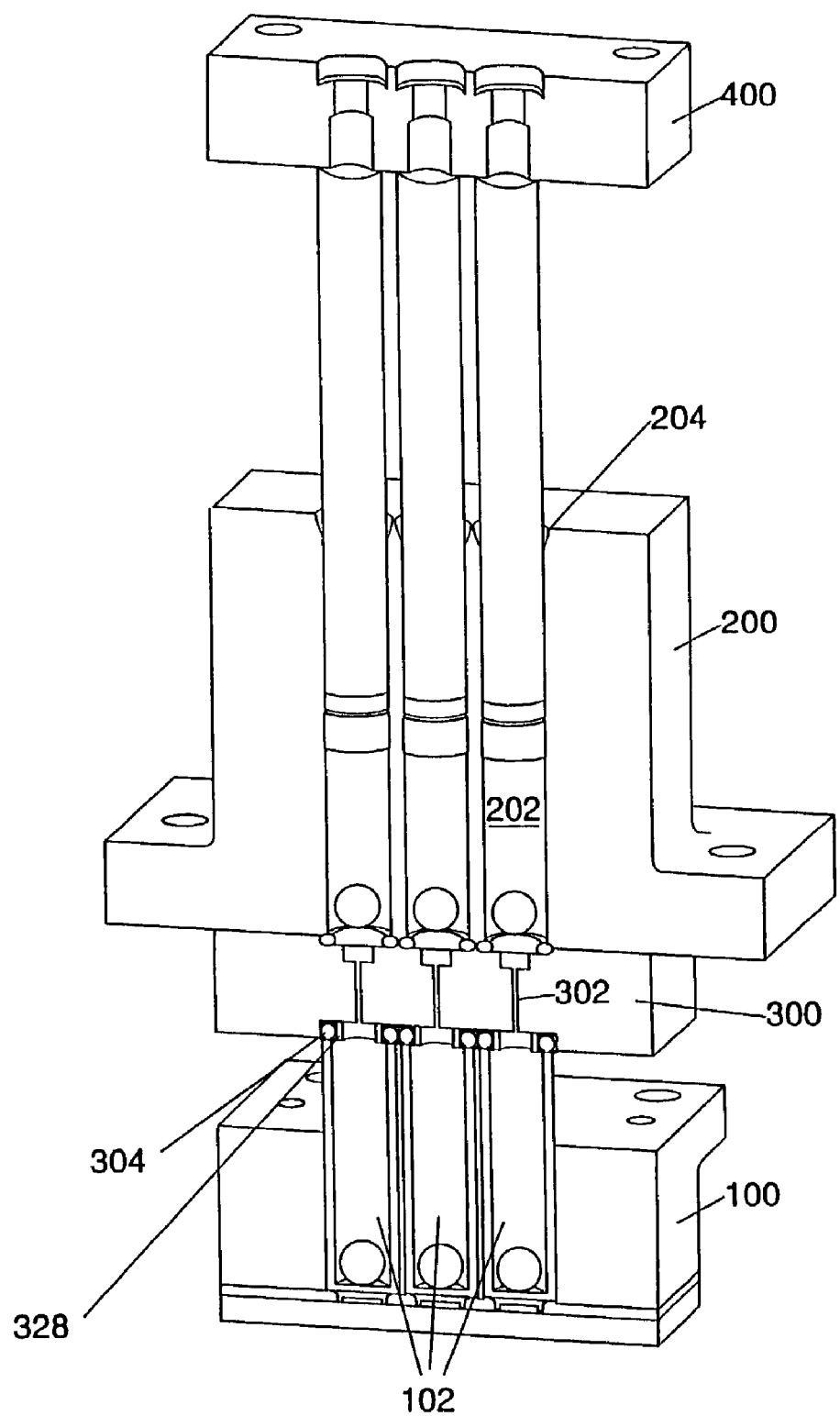
FIG. 7 illustrates an alternate embodiment of the continuous feed parallel reactor using only 6 wells, header vessels integrated with the header block, a monolithic orifice/insulator plate, and a rubber cushion supporting the bottom of the reactor wells.

The reactor block contains any desired number of wells. The embodiment shown in FIG. 1 has 96 wells. This embodiment is shown more clearly in FIG. 6, where the top of the reactor block 100 is shown in FIG. 6A having a plurality of wells 104. The bottom of the reactor block 100 is shown in FIG. 6B, showing the reactor bottom 110 having a plurality of holes 114 for receiving the spring pre-tensioners 106 (see FIG. 4 for the detail). Another embodiment is shown in FIG. 7, where three reactor vessels 102 are shown, without the reactor spring system just discussed. In the embodiment in FIG. 7, sealing and variation in reactor vessel height is accounted for by tightening the plate 300 to the reactor block 100 with bolts, clips, claimps or other fastening mechanisms known to those of skill in the art. The overall size of the reactor block and the volume of the reactor vessels influence the number of wells. Thus, if a larger volume reaction is desired, typically a fewer number of wells are in the reactor block. Preferably, there are at least 6 wells, more preferably at least 15 wells and even more preferably at least 48 wells. In the most preferred embodiment there are at least 96 wells. A 96 well reactor block may correspond to a standard microtiter plate format, namely an 8 by 12 array of wells on 9 mm spacing and is preferred due to its high throughput capacity and standardization of equipment. The reactor block also contains a temperature control system as described below.

Turing now to the header block 200, FIG. 3 shows a cutaway, detailed view of the bottom portion of the preferred header block. The header block 200 includes removable barrels 202 for receiving reactant(s) that are to be fed into the reactor during the reaction. As shown in FIG. 1, header wells 204 formed into a header block 200 contain the barrels 202. Although the header wells 204 can serve as barrels, removable barrels 202 provide several advantages. For example, they prevent fouling or contamination of the header block, requiring less cleanup following a reaction. When using removable barrels 202, one can also select barrels 202 made of a material appropriate for a given set of reactants and reaction conditions. The barrels can be obtained with very high dimensional precision, improving the seal between barrel 202 and plunger 402. If necessary, the barrels 202 can be discarded after use. This can lower system costs and ensure compatibility with standardized sample preparation and testing equipment by designing the header block 200 to accommodate commercially available vessels/barrels. In the preferred embodiment, the header block contains the same number of wells as the reactor block, in a matching configuration. The barrels 202 can be made of any material that is inert to the reaction, solvents, reactants, etc., including glass, plastic, etc. Preferably, the barrels are made of glass, for the same reasons that the reactor vessels are preferably made of glass.

Figure 8:
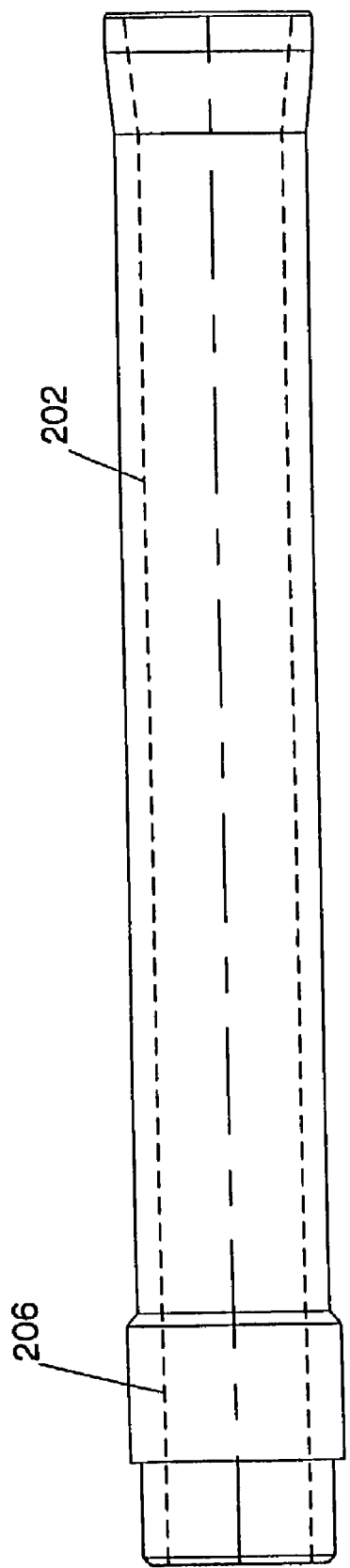
FIG. 8 is a view of the preferred embodiment of a header syringe.

The removable barrels 202 are shown in detail in FIG. 8. The barrel 202 may include a collar 206 on the outside of the barrel and near one end of the barrel. This collar keeps the spring compressed, performing the same function as the spring pre-tensioners and nut in the reactor block. The end of the barrel opposite the collar is flared to match the diameter of a header spring 210, shown in FIG. 1. As shown in FIG. 1, the header spring assembly 208 contains a spring 210 that forces the barrel 202 into the header seal 340. The header barrel is sized to match the diameter of the header spring 210. The header spring is preloaded in compression, similarly to the reactor spring 108 and for the same reasons. In this case, the preloaded compression force on the spring comes from appropriate sizing of the length of the header barrel and the spring, as well as a header block top plate 212 that compresses the spring to the appropriate preloaded force. As also shown in FIG. 1, the header block top plate 212 may fit into a broader section of the top of the header block or may be the top of the header block (not shown). There are two related functions the header spring assembly performs: (1) allowing for consistent sealing of a plurality of header barrels and (2) accounting for variances in the height of the header barrels, differential thermal expansion. As shown in FIG. 1, the top of the header barrels 202 contact the bottom of the header spring 210. The bottom of the header barrel 202 contacts a header seal 340 associated with the plate 300, which is discussed in detail below. As the plate 300 is secured to the header block 200 the header spring 210 provides the force to seal the barrel to the header seal 340. The amount of compression in the spring and the stiffness of the spring determine the amount of force pressing the bottom of the header barrel into the header seal. Therefore, different spring tensions allow for different pressures. The pressure in the header barrel can thus be adjusted for a particular reaction.

Also, the header spring assembly 208 allows for a variation in height in the header barrels with maintaining the same amount of pressure in each barrel. Because commercially available replacement header barrels have some height variation, this system accounts for that variation. Although this preferred embodiment employs a single header spring for each header well, in other embodiments, a single spring can be used for a plurality of header wells and barrels. A possible disadvantage is that sealing may not be sufficient; however, the number of wells, the uniformity of the barrels as well as the reaction being studied (e.g., a low-pressure reaction) may allow for a single spring system to sufficiently seal the barrels.

Figure 9:
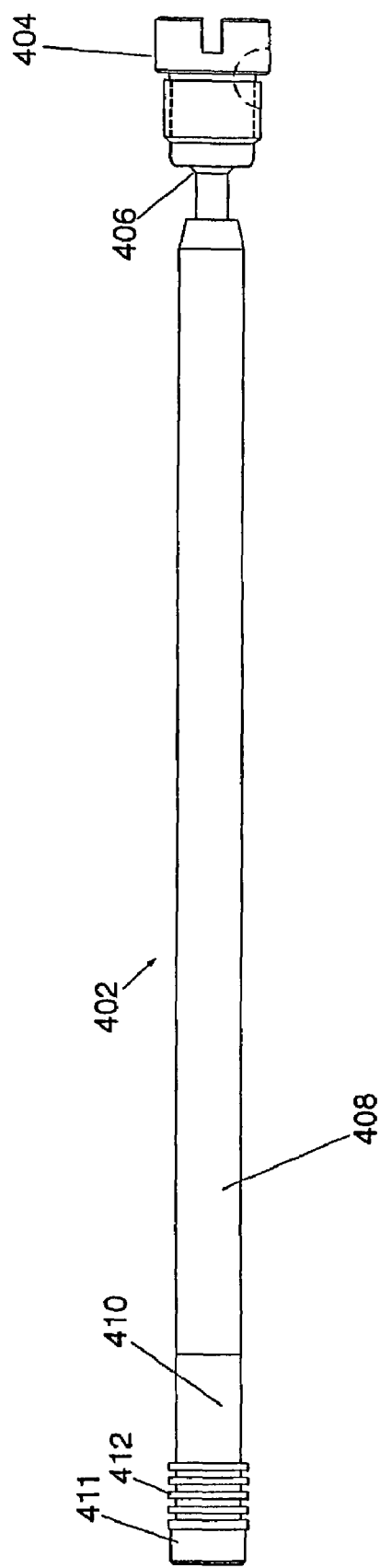
FIG. 9 is a view of the preferred embodiment of a syringe plunger

A plunger 402 runs through the center of the header spring assembly 208 to inject reactant(s) from the header into the reactor. Here, the plunger is the transfer method. The top of the plunger 402 is attached to a plunger plate 400, which in turn is associated with the drive system for driving the plungers forward to inject reactant(s) into the reactor from the header. A detail of the plunger is shown in FIG. 9. The top of the plunger 404 comprises a head that attaches to the plunger plate. Attachment can be by any method known to those of skill in the art. A preferred method of attaching the plunger top 404 to the plunger plate 400 is via a detachable method, such as by screwing the top of the plunger into the plunger plate. Clamping, bolting or other methods can also be used. A detachable attachment is preferred because it allows for plungers to be removed from the plunger plate for replacement or cleaning. Another preferred feature of the plunger is a swivel joint 406 between the plunger rod 408 and the plunger top 404. The swivel joint allows for some flexibility in the connection between the plunger and plunger plate while the plunger plate 400 is being pressed by the drive system. The plunger can be made of any suitably rigid material, such as metal.

The bottom portion of the plunger 402 has a plunger tip 410, shown in FIG. 9 in detail and shown in context in FIG. 1. The plunger tip 410 contacts the reactant(s) and forces them into the reactor from the header as the plunger moves forward. The plunger tip is fitted over the end of the plunger rod 408 with sufficient adhesion so that the tip does not come off of the rod when the plunger is moved backward. Those of skill in the art can decide on methods for fitting the tip over the end of the plunger rod. For example, the tip may be made of plastic that is heat shrunk onto the end of the plunger rod or it may seal against o-rings between the rod shaft and the plunger tip, when pressed into barrel 202. The plunger tip 410 contains one large raised portion 411 and one or more small raised portions 412 (shown in FIG. 9) for sealing the contents of the header barrel. As the plunger is moved forward, the raised portions 411,412 contact the inside of the header barrel 202 forming a seal. The size and number of raised portions will depend on the pressure in the system, but preferably there are from 2–10 smaller raised portions on the plunger tip. The plunger tip 410 is made of a material that is inert to the reaction, solvents, reactants, etc., including plastic, etc. Preferably, the tip is made of plastic, such as PTFE.

Referring again to FIG. 1, a plate 300 resides between the reactor block 100 and header block 200. The plate 300 is secured to both blocks and includes the transfer lines 302, the reactor seal 320 and the header seal 340. The plate can also function as either a heat conductor or insulator. As discussed below, heat may play an important roll in the reactions that can be run in this reactor system. In some circumstances, the heat that is applied to the reactors will be conducted to the reactant(s) that reside in the header. In other cases, the heat applied to the reactors is not to be conducted to the header barrels. Thus, the plate can be designed to either conduct heat or not. For most reactions, heat should be applied only to the reactor and not to the reactant(s) waiting in the header barrels for injection into the reactors. Thus typically, the plate will have thermal insulating properties and be made from a material that is a poor conductor of heat, such as stainless steel, ceramic, or plastic.

The plate 300 is attached to each of the reactor block 100 and header block 200 via a method of attachment that seals each to the plate with sufficient force to withstand the pressure of the reaction occurring in the reaction vessels. The method of attachment can be by bolting, clamping, clipping or other removable fasteners. For example, in the embodiment shown in FIG. 7, the plate 300 is bolted between the reactor block 100 and the header block 200.

Figure 10:
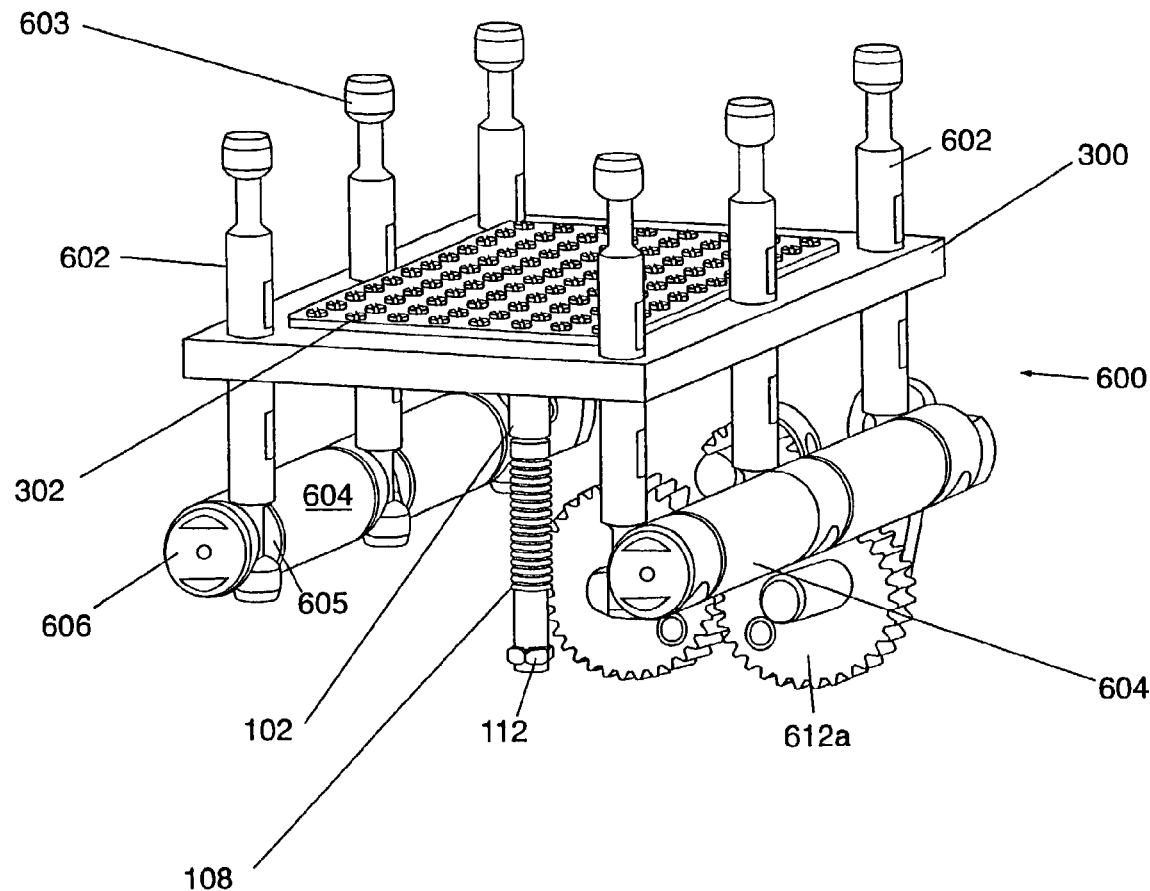
FIG. 10 is a view of the preferred reactor block latch mechanism, with the reactor block and all but one vessel hidden.

A preferred method for attaching the plate 300 to the reactor block and header block is via a latch mechanism 600, shown in FIG. 10. The latch mechanism 600 provides several advantages for combinatorial research. The latch mechanism 600 translates a single input motion to two counter-rotating drums 604, which pull the plate carrying the transfer lines 302 orthogonally onto the reactor vessel 102 and header barrel 202 lips without tilting the vessels or barrels, assuring little or no spillage from the reactor vessels or header barrels, and assuring uniform application of sealing force. Sealing of each reactor vessel and header barrel is simultaneous with the latch mechanism 600.

Figure 12:
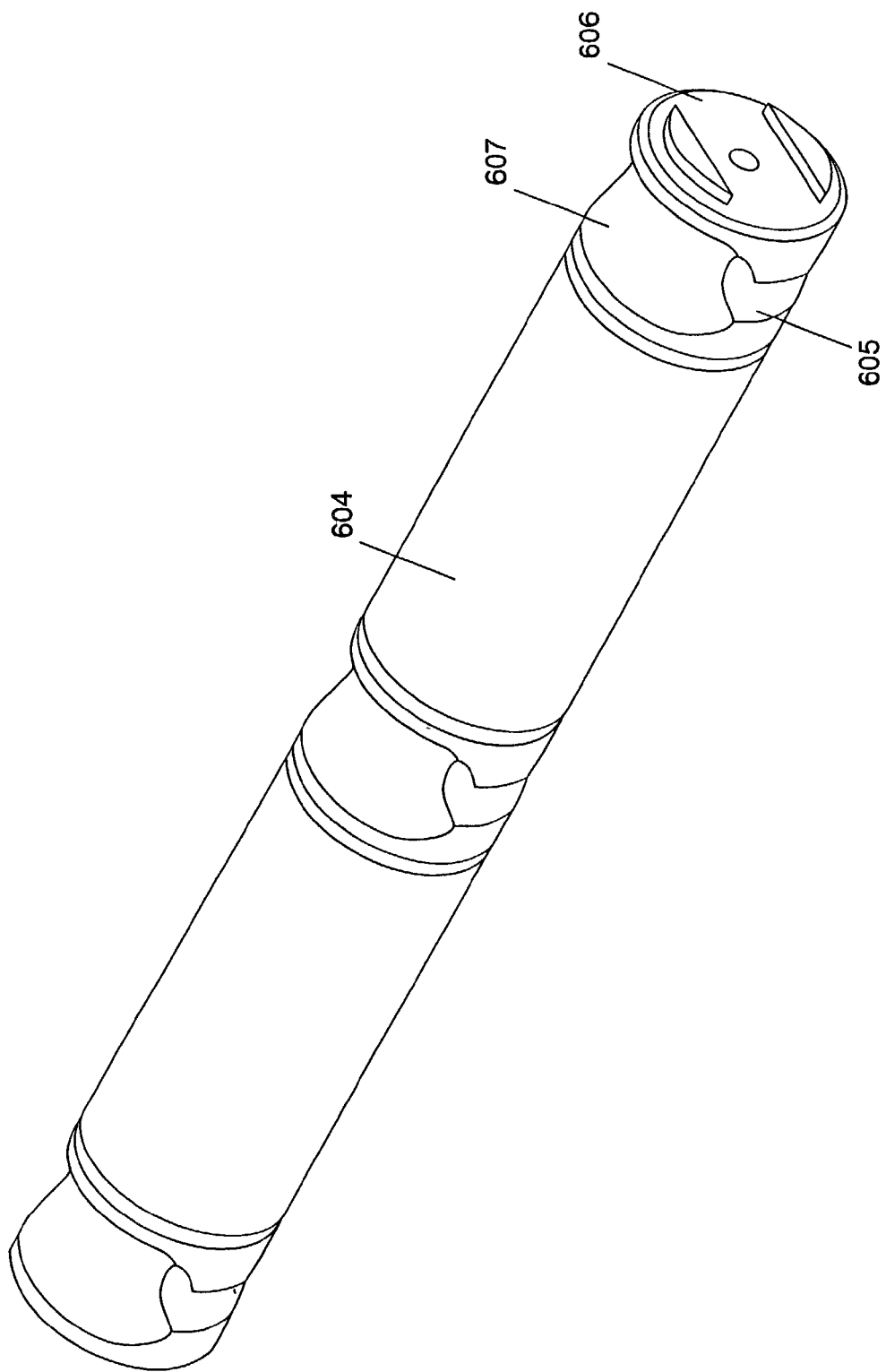
FIG. 12 is a detail of the preferred latch drum.

As shown in FIG. 10, the latch mechanism 600 includes one or more, preferably a plurality of, latch pins 602 that are fixed to the plate 300. The latch pins 602 engage a latch drum 604, which rotates pulling the latch pins 602 down thereby securing the plate to the reactor block and header block. The plate in most instances is locked to the block. In one embodiment, the latch mechanism 600 which has been fabricated for sealing an array of vessels supported by the reactor spring assembly 105 in the reactor block with each latch pin 602 having a hemispherical ball-tip 603 on the end of the latch pin 602. Shown in detail in FIG. 12, the latch drum 604 has a hemispherical socket 605 cut into its perimeter which mates with the ball-tip 603. The shape of the socket and pin is not critical. A relief 607 is provided in the latch drum 604 so that when the drum is in open position, the ball tip 603 can be inserted into the reactor block past the latch drum 604. The latch drum 604 is then rotated to its closed position (approximately one-quarter turn) so that the socket 605 mates with the ball tip 603 and pulling the latch pin 602 down.

Figure 11:
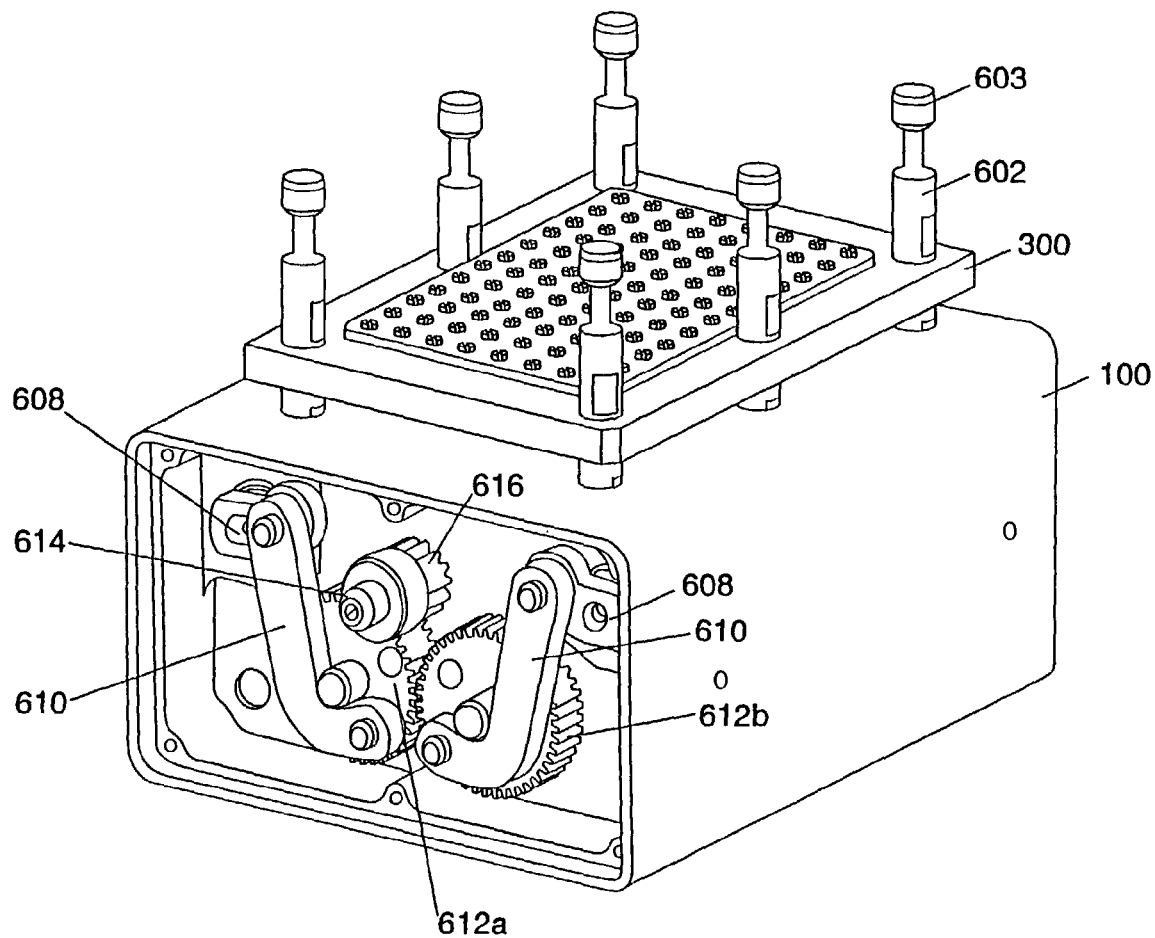
FIG. 11 is a view of the preferred reactor block latch mechanism.

Each end 606 of the latch drum 604 extends outward and beyond the edge of the end row of reactor vessels or header barrels to a latch arm 608, shown in FIG. 11. The latch drum arm 608 is pivotally attached to an over-center link 610, which in turn is attached to a latch gear 612 that is rotated by an input shaft 614 and pinion 616. The input shaft is rotated either manually or automatically. When the input shaft 614 is rotated, the pinion 616 engages the first latch gear 612a, which engages the second latch gear 612b thereby simultaneously moving the over-center links 610. The over-center links 610 rotate the latch arms 608, which rotate the latch drums 604, securing the latch pins 602 and thus securing the plate 300 to the reactor block 100.

There are preferably at least two latch drums 604 in each of the reactor block and header block, on opposite sides of the block. The latch gears 612a, 612b allow the two symmetrical latch drums 604 to counter-rotate fully sealing both the vessels and barrels. As shown in FIGS. 10 and 11, the latch mechanism completes a four-bar mechanism with the gears 612a, 612b, drum arm 608, and reactor block. This four-bar mechanism is optimized to be quick-acting, with a rapidly increasing mechanical advantage as the mechanism is actuated to a closed position, and a corresponding decrease in drum rotation for input gear rotation. For a constant velocity input to the driving gear, this quick-acting movement opens or closes the drums 604 rapidly, slowing down for the final portion of the stroke when the preloaded springs 108 become engaged, best seen in FIG. 10. Once the latch drums 604 have pulled the latch pins 602 far enough to adequately press the reactor seal against the vessels 102, the over-center link 610 goes over-center by a few degrees. This provides a locked position requiring no input force to hold the mechanism closed. To release, the input shaft 614 is simply rotated in the reverse direction past this over-center position, and the springs 108 push the mechanism open.

Although the latching mechanism 600 is shown for the reactor block, the same mechanism is in the header block 200 for attaching the plate 300 to the header block 200. The latch mechanism 600 operates in the header block in the same fashion as in the reactor block. Other embodiments of this latch mechanism could be accomplished via eccentric cams, worm gears or other simple mechanisms.

In the constant volume embodiment of this invention, the reactor vessels are sealed to the outside except for the transfer line and the header barrels are sealed to the outside also except for the transfer line. These are pressure tight seals that withstand pressures up to 1000 psi, depending on the sealing material and method chosen. The preferred embodiment of this closed system has three seals, but could have more seals in other embodiments. For example, the system in FIG. 2 has four seals, two seals where the feed line joins the barrel 202 to the pump 20 and two seals where the transfer line 302 joins the pump to the wells 104. In the preferred embodiment, the three seals are at the plunger tip 410 sealed to the inside of the header barrel 202, the header barrel 202 lip sealed to the plate 300 and the reactor vessel 102 lip sealed to the plate 300. The first of these seals is discussed above.

In this preferred embodiment, the header seal 340 is the seal between a lip of the header barrel 202 lip and the plate 300. Similarly, the reactor seal 320 is the seal between a lip of the reactor vessel 102 and the plate 300. Basically, the preferred sealing method has a lip of the reactor vessel or header barrel forced into a material that receives the lip. This sealing method has several embodiments.

The most preferred sealing method is shown in FIG. 3. Looking first at the reactor seal 320, there is a gasket 322 that fits over one end of the transfer line 302, with the gasket 322 fitting snuggly to the outer diameter of the transfer line 302 and extending beyond the diameter of the reactor vessel 102. The gasket 322 is associated with the plate 300 in that the gasket is attached to the plate without allowing substantial leakage between the gasket and the plate. Although some leakage may occur, it is kept to a minimum by tightening the attachment means, which attaches the reactor block 100 to the plate 300. When the reactor vessel 102 lip is tightened up against the gasket 322, the gasket 322 conforms to the lip of the vessel 102 while the end of the transfer line 302 extends into the vessel. The gasket 322 is preferably a continuous sheet that fits over each transfer line for each reactor vessel 102 in the array of wells and vessels that comprise the reactor block. A continuous sheet has the advantage of ensuring that the diameter of the reactor vessels 102 does not extend beyond the edge of the gasket 322, and can be replaced for all vessels simultaneously. The properties of the gasket can be selected to account for different sealing pressures, with the seal withstanding a pressure in the reactor vessel of up to about 1000 psi without leaking. Also, the gasket material should be inert to the reaction conditions and chemicals in the reaction. In this embodiment, the gasket can be made of perfluoroelastomer, such as Kalrez or some other chemically resistant elastomer. Most preferably the gasket is made from PTFE (Teflon) encapsulated silicone rubber.

Similarly shown in FIG. 3, in the most preferred embodiment of the header seal 340 there is a header gasket 342 that fits over the other end of the transfer line 302, with the header gasket 342 fitting snuggly to the outer diameter of the transfer line 302 and extending beyond the diameter of the header barrel 202. When the header barrel 202 lip is tightened up against the header gasket 342, the gasket 342 gives to accept the lip of the barrel 202 while the end of the transfer line 302 extends into the header barrel. The header gasket 342 is preferably a continuous sheet that fits over each transfer line for each header barrel 202 in the array of wells and barrels that comprise the header block. A continuous sheet has the advantage of ensuring that the diameter of the header barrels 202 do not extend beyond the edge of the header gasket 342. The properties of the gasket can be selected to account for different sealing pressures, with the seal withstanding a pressure in the header barrel of up to about 1000 psi without leaking. Also, the gasket material should be inert to the reaction conditions and chemicals in the reaction (e.g., the reactant(s)). In this embodiment, the gasket can be made of a perfluoroelastomer such as Kalrez or some other chemically resistant elastomer. Most preferably the gasket is made from PTFE (Teflon) encapsulated silicone rubber.

Figure 13A:
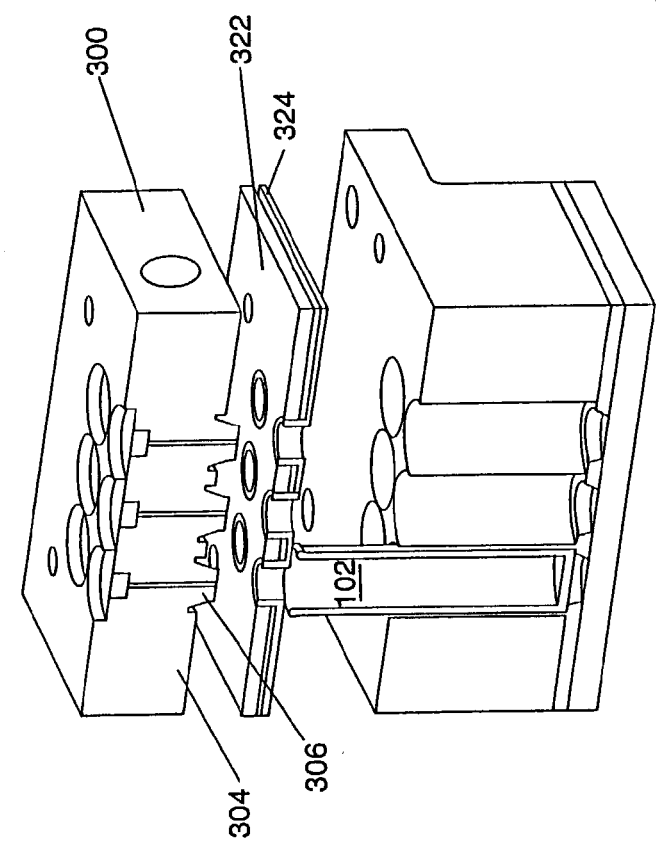
FIG. 13 illustrates an alternate embodiment of reactor vessel seals utilizing an inert "taper seal sheet" which is flared by pressing onto a conical protrusion in the insulator block.
Figure 13B:
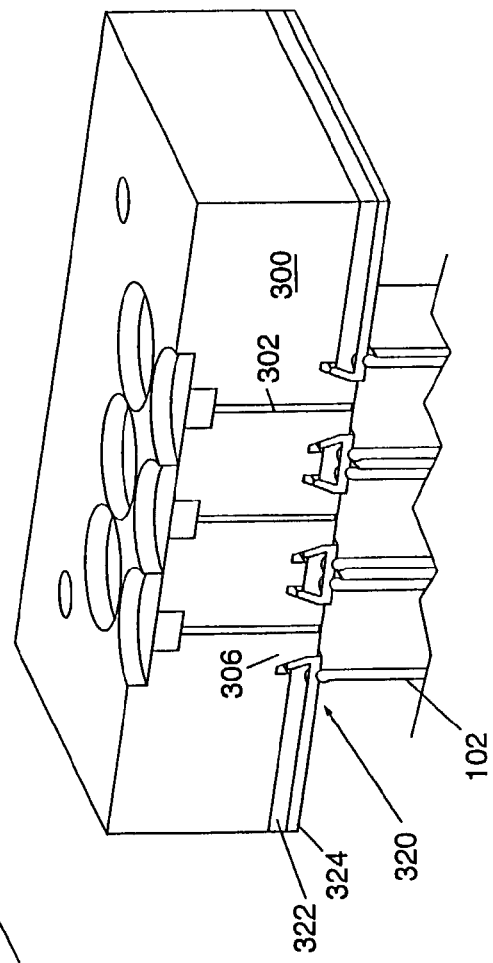

Another sealing embodiment is shown in FIG. 13. As shown in FIGS. 13A & B, the reactor seal 320 includes a rubber reactor gasket spring 322 that fits into a channel 304 that is cut into the plate 300. A feature of the channel 304 is a tapered portion 306 for receiving the lip of the reactor vessel 102. Optionally, a second inert gasket 324 is in between the reactor gasket spring 322 and the reactor vessel 102 to provide additional inert properties with respect to the reaction conditions and chemicals in the reaction being studied. Although not shown in FIG. 13, this same seal could be used for the header seal. The properties of the gasket and second gasket can be selected to account for different sealing pressures, with the seal withstanding a pressure in the reactor of up to about 1000 psi without leaking. Also, the gasket material should be inert to the reaction conditions and chemicals in the reaction (e.g., the reactant(s)). In this embodiment, the gasket can be made of silicone rubber. Most preferably the gasket is made from either Kalrez or some other chemically resistant elastomer. The second gasket can be made of PTFE (Teflon).

Figure 14:
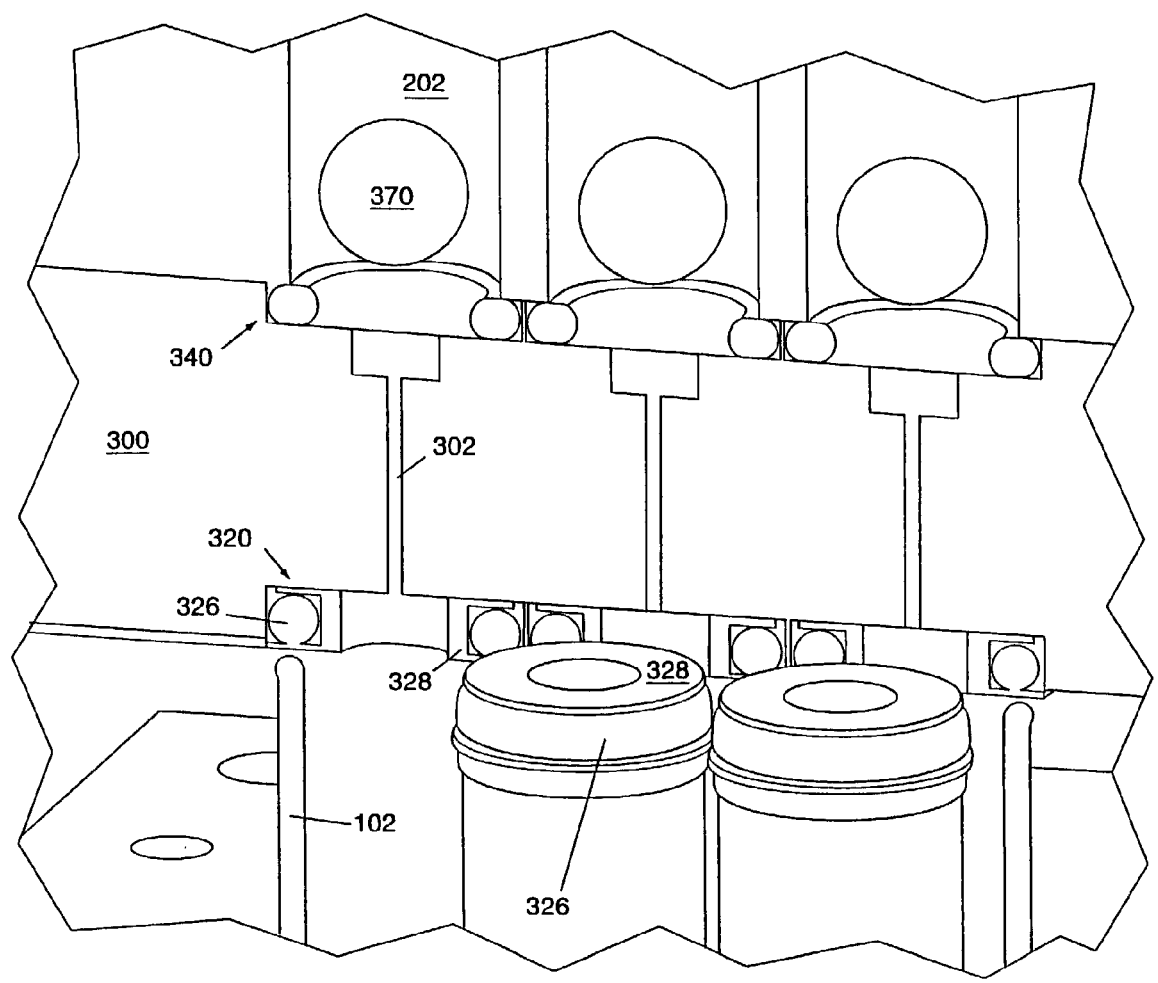
FIG. 14 illustrates an alternate embodiment of reactor vessels seals utilizing a composite seal made up of an o-ring fitted onto an inert spool.

Yet another sealing embodiment is shown in FIG. 14. An o-ring 326 rests inside a spool 328, which is placed at the end of the reactor vessel 102. The transfer line 302 feeds reactant through the center of the spool. When the vessel 102 lip is tightened against the reactor seal 320 a seal is formed. As shown in FIG. 7, the spool 328 rests inside a channel 304 cut into plate 300 that is designed to accommodate the shape of the spool 328. Preferably, the spool is made of plastic and more preferably PTFE (Teflon). The o-ring may be made of a standard material such as silicone rubber. This seal has particularly good thermal insulating properties. FIG. 14 also shows a mixing ball 370 in the barrel 202.

Figure 15:
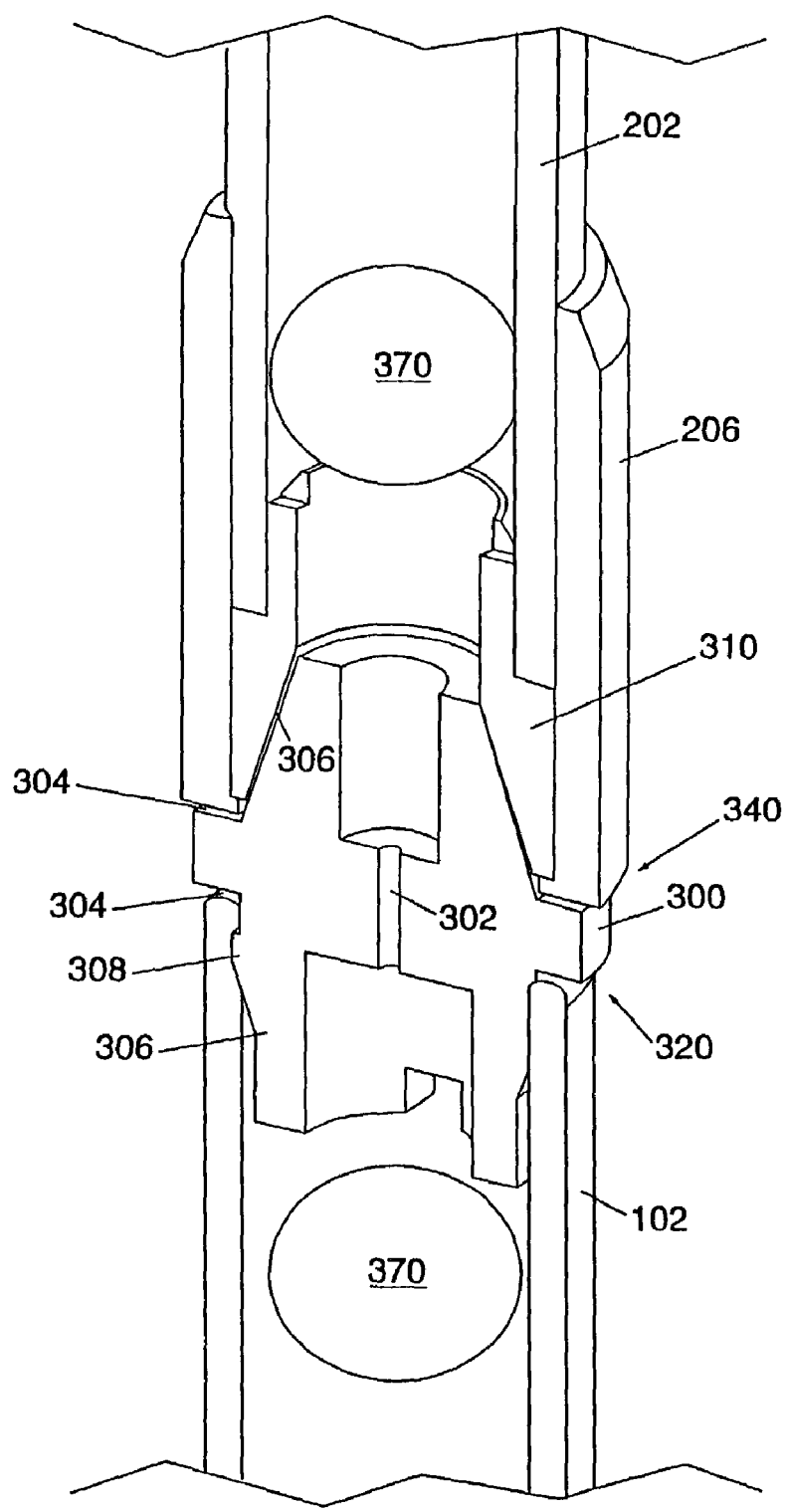
FIG. 15 illustrates an alternate embodiment of individual insulator orifices as seals, which snap into the reactor vessels, and engage the header vessels with a taper fit.

Still another sealing embodiment is shown in FIG. 15. In this embodiment, the reactor seal 320 comprises a channel 304 cut into the plate 300 for receiving the reactor vessel 102 lip. In this embodiment, the plate 300 is an individual piece for each vessel, and preferably a plastic material so as not to damage the reactor vessels. To seal, the inner surface of the reactor vessel snaps into the tapered portion 306 of the channel 304 via a raised portion 308. For the header seal 340 embodiment shown in FIG. 15, the collar 206 of the header barrel 202 extends over a tapered tip 310, which fits over the tapered portion 306 of the channel 304 on the header side of the plate 300. This system also snaps the header barrel to the plate to form the seal. Preferably the wetted portions of this seal embodiment are inert to the reaction conditions and chemicals in the reaction. FIG. 15 also shows mixing balls 370 in the reactor vessel 102 and header barrel 202.

Figure 16:
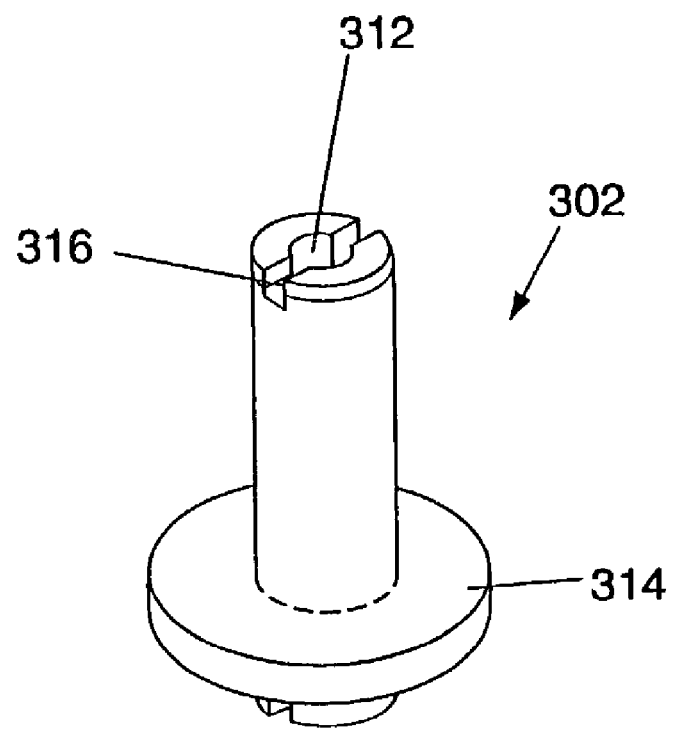
FIG. 16 shows a detail of the preferred embodiment of an orifice insert used to separate the reactor vessels from the header vessels, which is pressed into a carrier plate.

The transfer lines function to transfer reactant(s) from the header into the reactor. They are preferably inert to the reactants being studied. Also preferably, the transfer lines are sized (either in length or diameter) so that the injection velocity into the reactor from the barrel is higher than the back diffusion velocity from the reactor into the barrel. Preferably, the amount of diffusion of reaction components from the reactor to the header is limited. For example if a sufficiently small diameter is chosen for the transfer line, chemicals that are reacting or are needed in the reaction (such as solvent, scavengers, etc.) will remain in the reactor and not diffuse to the header. The transfer lines 302 can be tubing or conduit as shown in FIG. 2. The transfer lines 302 can be channels in plate 300 as shown in FIGS. 13, 14 and 15. In the preferred embodiment shown in FIG. 1, the transfer lines 302 are inert inserts that fit into a hole in the plate 300. A detail of the preferred transfer line 302 is shown in FIG. 16, where the transfer line includes a line 312 running the length of the insert that allows the communication of fluids from the header to the reactor. At one end of the insert is a flange 314 that holds the insert in place and prevents it from moving. This flange is preferably placed at the reactor side of the plate 300 (as shown in detail in FIG. 3). Continuing with FIG. 3, the line 312 is shown as larger in diameter at the header side than at the reactor side, which is preferred to limit diffusion of chemicals from the reactor to the header. Another feature of the inserts is a channel 316 (also shown in FIG. 16), transverse to the axis of the transfer line 312, in each end of the insert to allow for the flow of reactant in the presence of a mixing ball so that the mixing ball cannot block the line 312.

Figure 17:
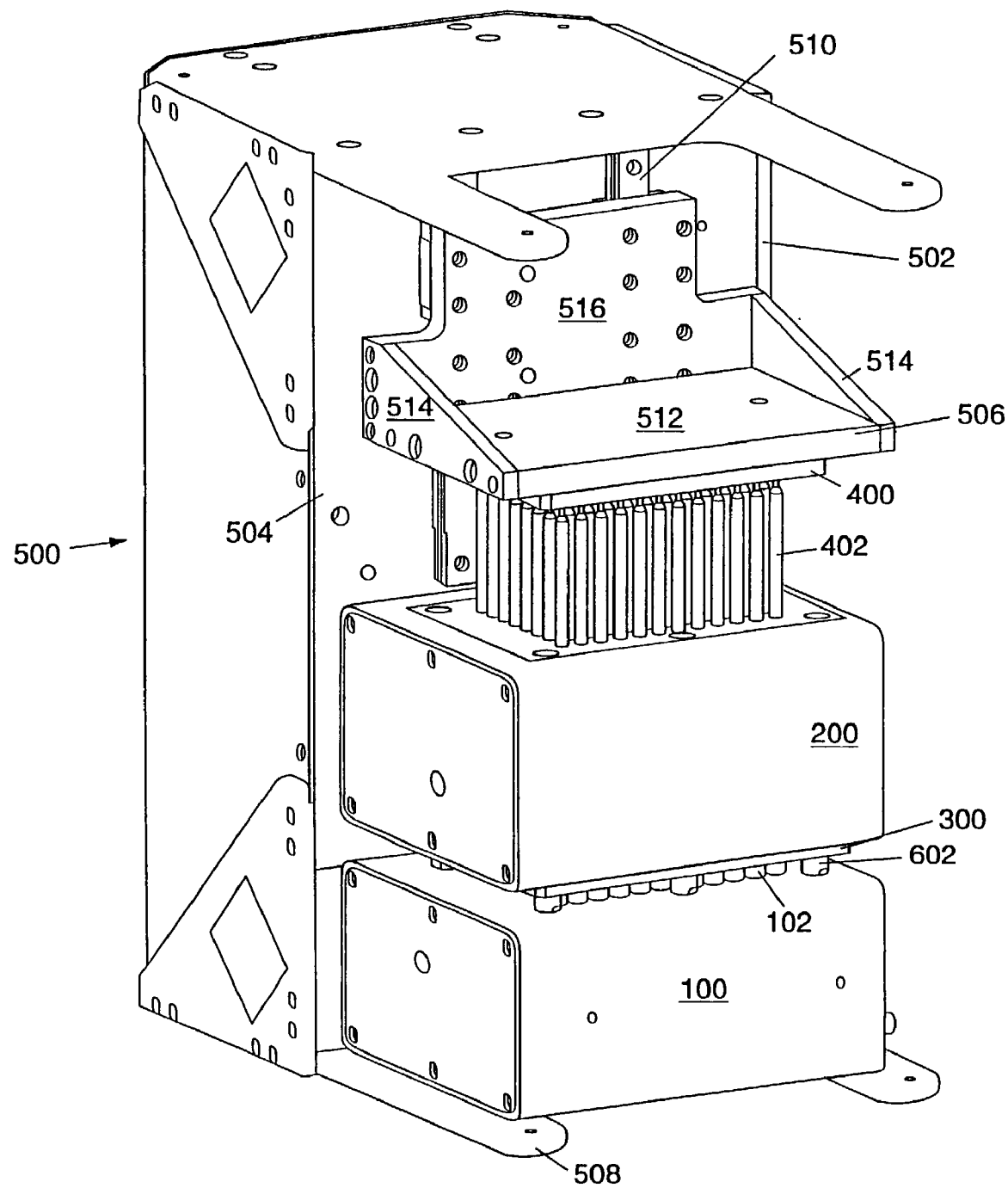
FIG. 17 shows a front view of the preferred embodiment of the drive system with the reactor block and the header block.
Figure 18:
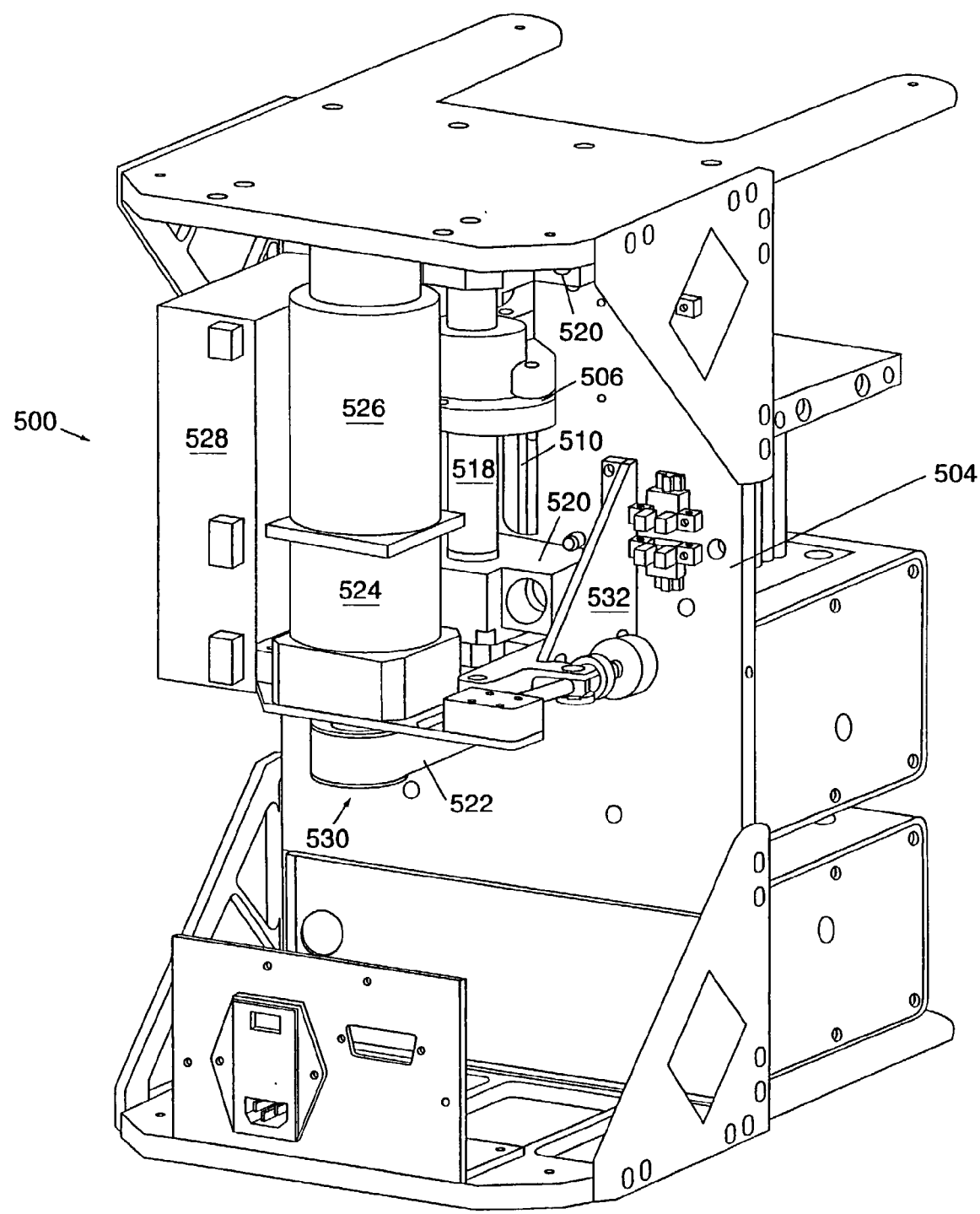
FIG. 18 shows a back view of the preferred drive system.

The preferred drive system is shown in FIGS. 17 and 18. Looking first at FIG. 17, the reactor block 100 is shown with a plurality of reactor vessels 102 that are sealed to the plate 300, which in turn is sealed to the reactor block 200. A plurality of plungers 402 is shown extending into the header block 200 from the plunger plate 400. The entire system, from bottom of the reactor block 100 to the top of the plunger plate 400 is associated with the drive system 500, which functions to force the plunger plate down so that the plungers feed reactant(s) from the header barrels to the reactor vessels. Conceptually, the drive system 500 could simply be a weight of sufficient mass that drives the plunger plate down due to gravity. However, such a system could not function in alternative embodiments where the entire system is placed on a rocking plate for mixing.

Thus, the preferred drive system comprises a frame 502 having a center support 504 with a movable carriage 506 extending therefrom at about a right angle at one end and a fixed arm 508 extending therefrom also at about a right angle at the other end. The center support 504 is shown as a plate, however, other designs will be evident to those of skill in the art, including a series of two or more rails. The carriage 506 freely moves along the length of the center support 504 on one or more rails 510, which may be fixedly attached to the center support 504 and attached to the carriage via a clamp and bearings (not shown) to allow smooth movement. Alternatively the rails may be attached to the back of the carriage, with the clamp and bearings being fixedly attached to the center support. It is preferable to reduce friction in the movement of the carriage 506 with respect to the center support 504. The method of attachment is not critical to the invention and those of skill in the art may use other reduced friction types of attachments.

The carriage 506 comprises a flat plate 512 extending approximately perpendicularly from the rails 510 with the bottom of the flat plate 512 contacting the plunger plate 400. The carriage 506 could comprise this plate alone, however for higher pressures in the reaction system (e.g., reactor vessels, header barrels and transfer lines), it is preferred that the carriage be able to withstand high forces and the embodiment shown in FIG. 17 exemplifies such a carriage 506. The carriage 506 in FIG. 17 comprises a flat plate 512 connected at each side to carriage support plates 514. The carriage flat plate 512 and carriage support plates 514 are attached to a carriage back plate 516, which in turn is connected to the clamp and bearings for movement along the rails 510. This preferred carriage 506 design is capable of driving 96 plungers forward without deformation. The carriage design is not critical to the invention and other carriage designs will be apparent to those of skill in the art.

The back of the preferred drive system 500 is shown in FIG. 18. The back of the carriage 506 extends through the center support 504 and is attached to a lead screw 518. The lead screw 518 is attached by supports 520 to the center support 504, such that the lead screw 518 may rotate within supports 520. The lead screw 518 is threaded with matching threads on the back of the carriage 506 so that when the lead screw rotates, the carriage 506 moves up and down along the rails 510. A toothed belt 522 joins one end of the lead screw 518 to a gear head 524. The belt 522 need not be toothed, but slippage is preferably avoided with such a belt. The method of rotating the lead screw is not critical to the invention and other methods of transmitting motion will be evident to those of skill in the art. A motor 526 rotates the gear head 524. The motor 526 may be either AC or DC driven and is preferably a commercially available gear motor, such as Industrial Devices model G23PI-S23-0100 or equivalents. Other features of the preferred drive system shown in FIG. 18 include the belt tensioner 532 for maintaining the tension on belt 522 to further avoid slippage. Also shown in FIG. 18 is a motor amplifier 528 for converting commands to appropriate electrical signals for the motor, such as Applied Motion Products model PD2035 or equivalents.

This preferred drive system 500 operates by the motor 526 turning gear head 524 and gear 530, which move the belt 522 and which in turn rotates the lead screw 518, leading to movement of the carriage. This system is preferred because it is strong, compact and can operate either vertically or horizontally or at other angles. Given these features, the drive system with reactor system in place can be placed on a rocking platform or other oscillating mechanism for mixing the reaction and reactant(s) with a mixing ball. Obviously, in the stationary vertical position, mixing balls would be ineffective and another mixing method would be employed, such as magnet stir bars. Because reaction products can be influenced by mixing intensity, a uniform mixing rate ensures that any differences in products does not result from mixing variations. Thus, mixing balls are preferred with this invention. See commonly assigned U.S. patent application Ser. No. 09/177,170 filed Oct. 22, 1998 which is herein incorporated by reference, for alternative mixing embodiments that are also useful in this invention.

Figure 19:
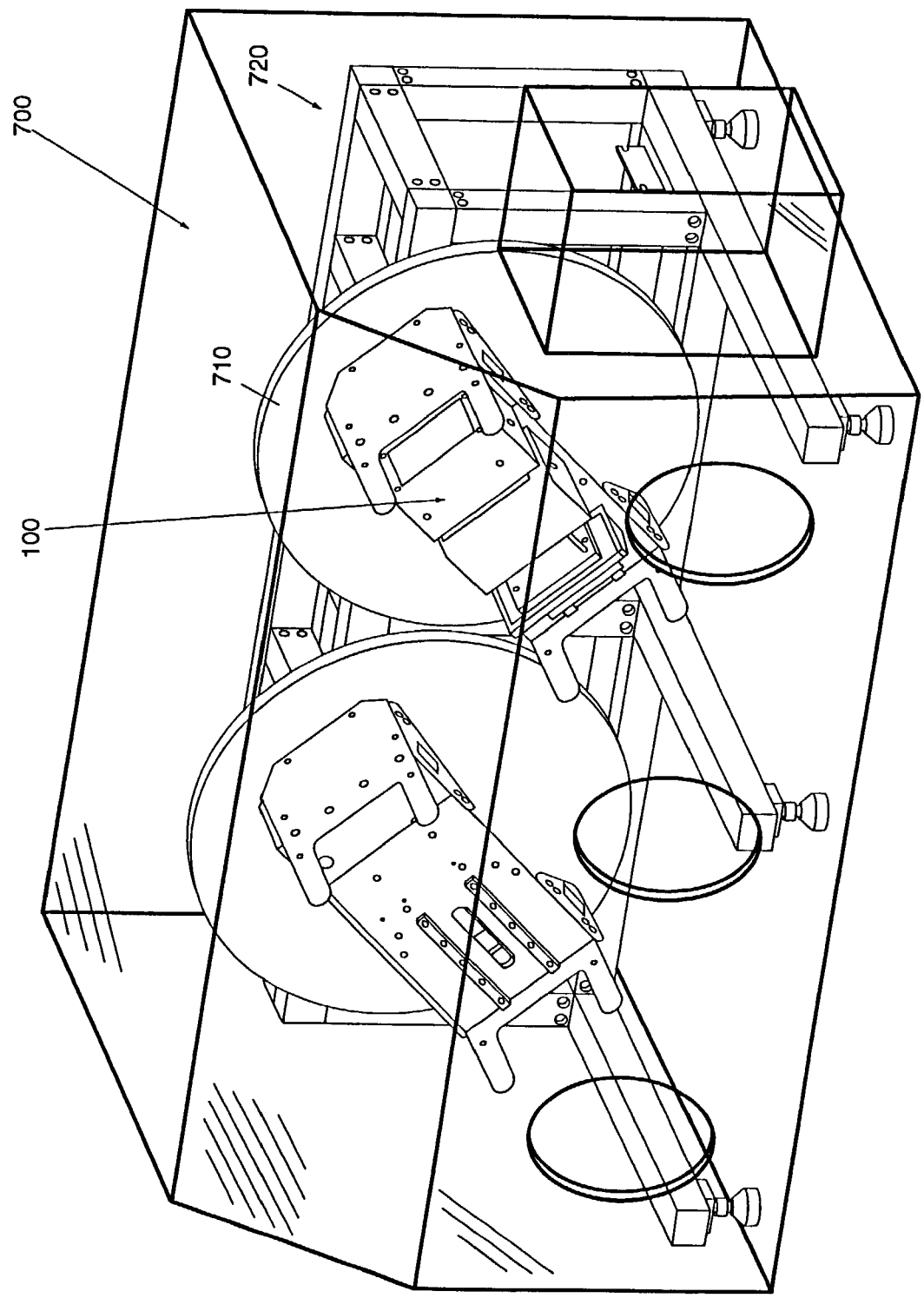
FIG. 19 shows the preferred embodiment of a mixing system and inert atmosphere enclosure for the continuous feed parallel reactors, in which two reactors and drive systems are mounted to rotary tables.

Depending on the nature of the starting materials, types of reactions and method used to characterize reaction products and rates of reaction, it may be desirable to enclose either the entire system or reactor block 100 in a chamber 700, as shown in FIG. 19. The chamber 700 may be evacuated or filled with a suitable gas, such as an inert gas like nitrogen or argon. This chamber is most usefully a glove box (or dry box), such as those sold commercially by Vacuum Atmospheres, Inc. In some cases, the chamber 700 may be used only during the loading of starting materials into the vessels 102 and/or barrels 202 to minimize contamination during sample preparation, for example, to prevent poisoning of oxygen sensitive catalysts. In other cases, the chamber 700 may be used during the reaction process or the characterization phase, providing a convenient method of removing one or more fluids from all of the vessels 102 simultaneously. In this way, a gaseous reactant could be added to all of the vessels 102 at one time.

Another feature of FIG. 19 that should be noted is the rotating plate 710 pivotally mounted on a support platform 720 and driven by a motor (not shown). This is an alternative embodiment to the rocking plate that has been discussed throughout this specification. The embodiment shown in FIG. 19 shows the rotating plate 710 with the entire reactor system and drive system attached. The rotating plate turns at a predetermined rate to allow the mixing balls in the reactor vessels and/or header barrels to mix the contents thereof.

Figure 20:
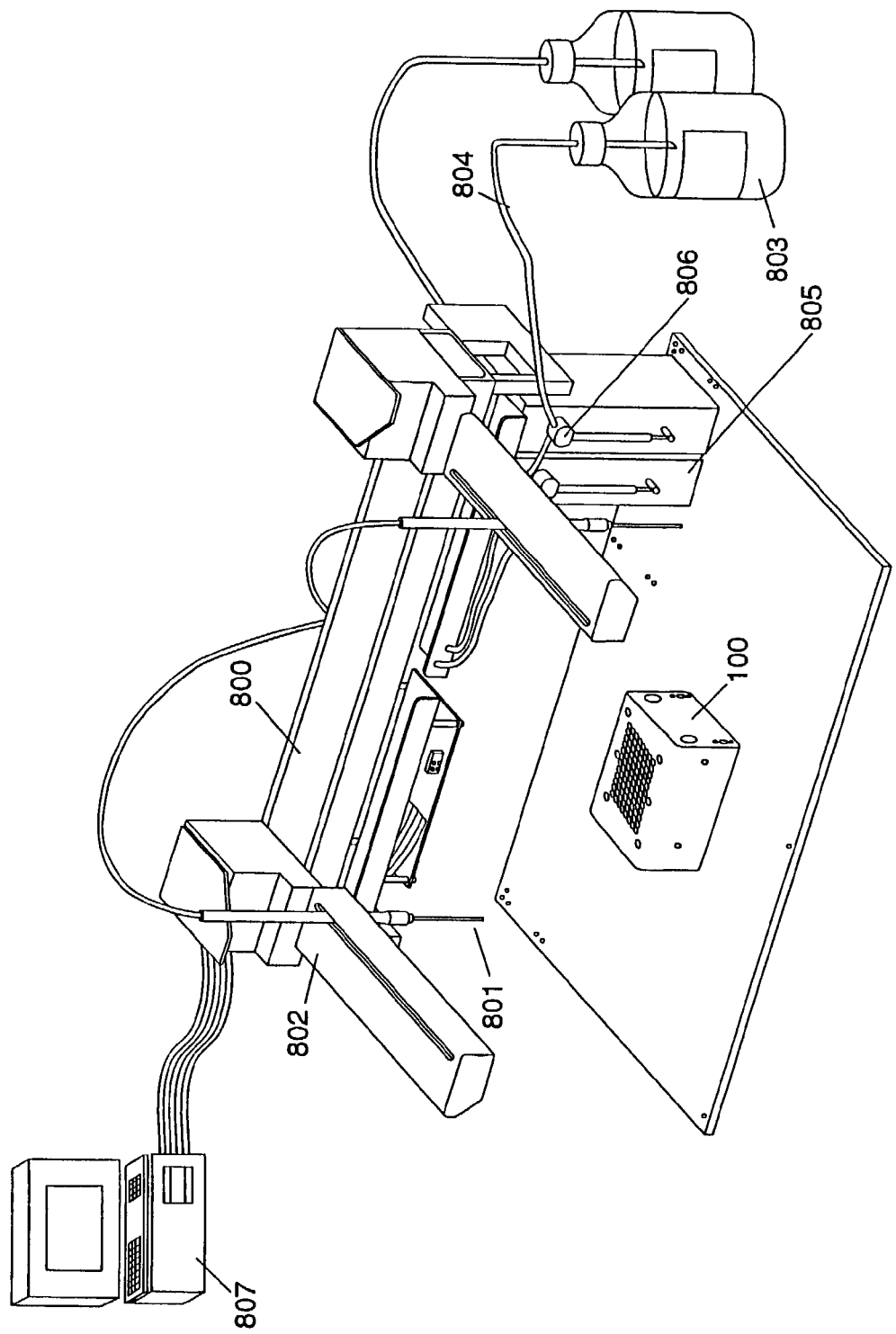
FIG. 20 shows the preferred embodiment of a liquid handling robot used to dispense diverse chemicals into the header and reactor vessels.
Figure 21B:
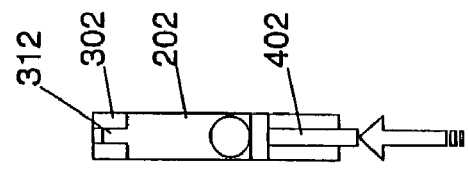
FIG. 21 shows the preferred method of filling and assembling the header and reactor vessels.
Figure 21D:
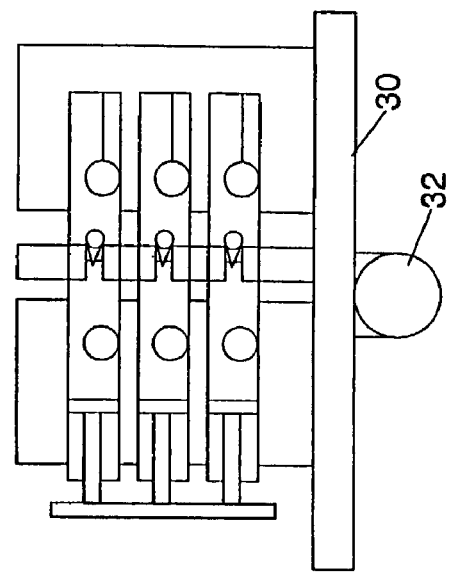
Figure 21A:
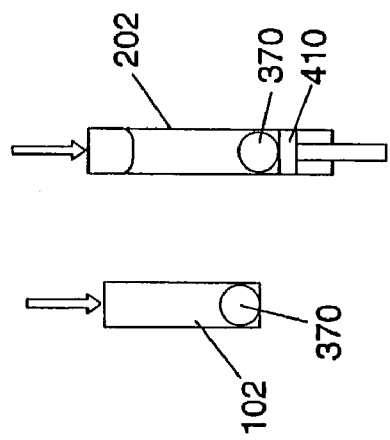
Figure 21C:
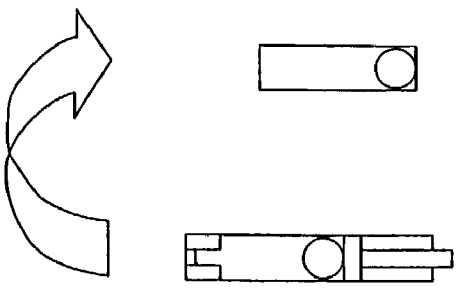

Typically, the reactants are liquids (but they may be one or more gases). When one or more of the contents of the reaction (such as the solvent, catalyst, monomer, scavenger, initiator, etc.) is a liquid, an automated liquid handling system may be employed to handle the liquid. As illustrated in FIG. 20, a robotic liquid handling system 800 is may be used to load vessels and barrels with starting materials. The robotic system 800 includes a probe 801 that dispenses measured amounts of liquids into each of the vessels and/or barrels. The robotic system 800 manipulates the probe 801 using a 3-axis translation system 802. The probe 801 is connected to one or more sources 803 of liquid reagents through flexible tubing 804. Pumps 805, which are located along the flexible tubing 804, are used to transfer liquid reagents from the sources 803 to the probe 801. Suitable pumps 805 include peristaltic pumps and syringe pumps. A multi-port valve 806 located downstream of the pumps 805 selects which liquid reagent from the sources 803 is sent to the probe 801 for dispensing in the vessels and/or barrels. FIG. 20 shows a reactor block 100 in place for loading, but a series of vessels or barrels or a header block could also have been shown.

The robotic liquid handling system 800 is controlled by a processor 807. In the embodiment shown in FIG. 20, the user first supplies the processor 807 with operating parameters using a software interface. Typical operating parameters include the coordinates of the vessels and the initial compositions of the reaction mixtures in individual vessels. The initial compositions can be specified as lists of liquid reagents from each of the sources 803, or as incremental additions of various liquid reagents relative to particular vessels. Similarly, the robotic handling system may dispense reactant into the header barrels. See commonly assigned U.S. patent application Ser. No. 09/174,986, filed Oct. 19, 1998 incorporated herein by reference, for a computer program that may be used for designing experiments that a liquid robotic handling system may use for dispensing components. See also, U.S. Pat. No. 5,104,621 and WO 98/40159 for robotic workstations.

The robotic handling system may be used in a methodology shown in FIG. 21. Looking first at FIG. 21A, liquid reactants are added to both the reactor vessel 102 and the header barrel 202 (shown with the plunger tip 410). FIG. 21B is next where the plate 300 having transfer lines 302 with orifices 312 is attached to the header barrels 202 forming the header seal and the plunger 402 is optionally moved forward to expel gas from the header barrel 202. Turning to FIG. 21C, the header barrels 202 are inverted to connect the plate to the reactor vessels 102 forming the reactor seal. The reactant(s) in the header do not spill out because of surface tension given the size of the orifice 312. This reactor system is then put into the drive system and then entire assembly is put onto a rocker platform 30, shown in FIG. 21D, that rocks back and forth over a pivot point 32.

Figure 22:
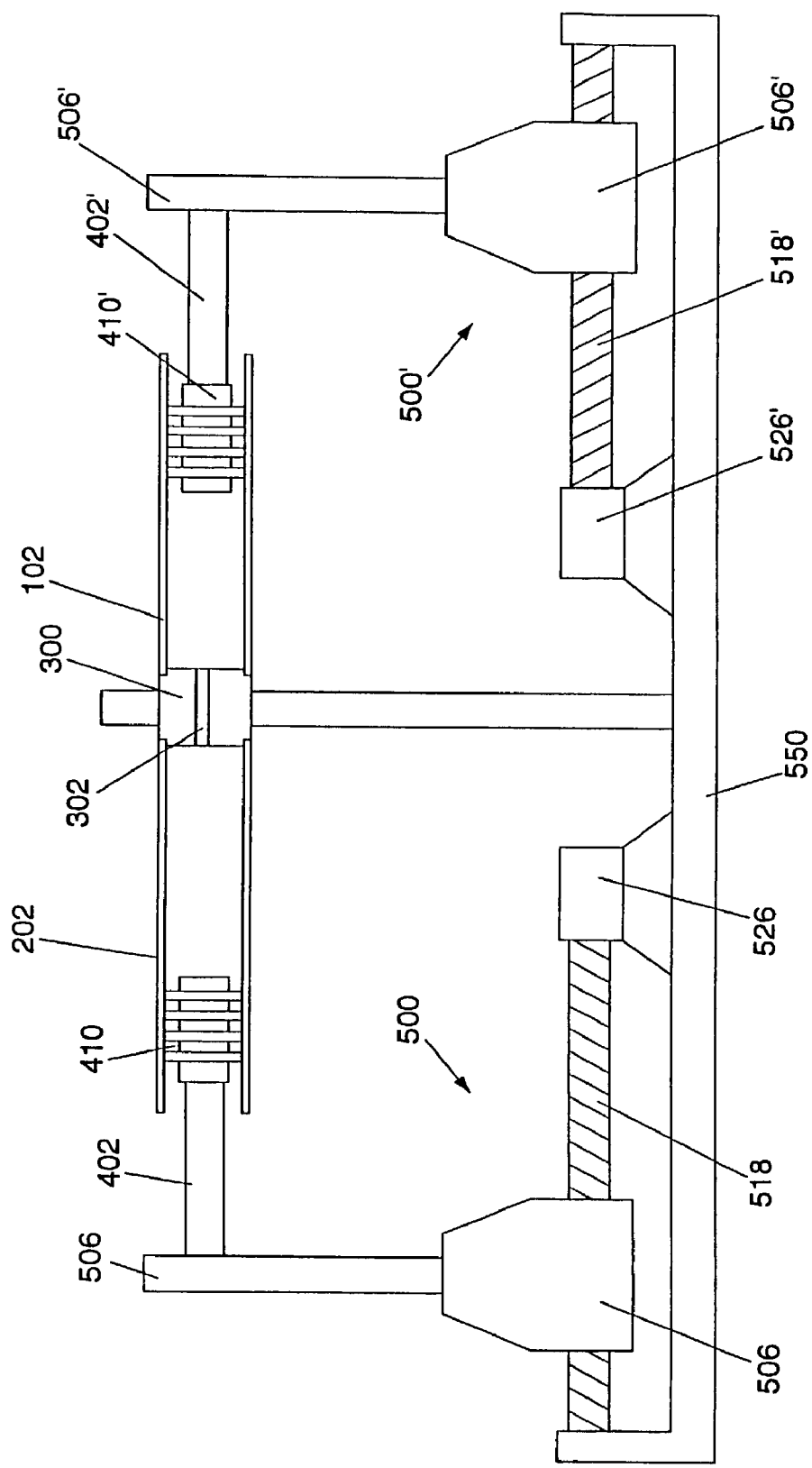
FIG. 22 shows an alternate embodiment of the continuous feed parallel reactor in which the reactor vessel volume as well as the header vessel volume is variable.

FIG. 22 shows another embodiment of this invention, which will build less pressure due to compression of the headspace during reaction. Shown there is a single reactor vessel 102 sealed to a plate 300 that contains the transfer line 302. The header barrel 202 is also sealed to the plate 300. The header barrel 202 has a plunger 402 that controls the volume of the header barrel 202 by moving forward and backward as controlled by a drive system 500. This is similar to that discussed above. In this embodiment, the reactor vessel 102 also includes a plunger 402' that controls the volume of the reactor vessel 102 by moving froward and backward as controlled by a reactor drive system 500'. The reactor drive system 500' is similar to or identical to the header drive system 500, which has been discussed in detail. With both parts, one end of the plungers 402, 402' is attached to a plunger plate (not shown) that may be part of or separate from a carriage 506, 506'. The carriage 506, 506' is moved forward and back by a lead screw 518, 518', which is rotated by a motor 526, 526'. The header barrels 202 and reactor vessels 102 are sealed at the plunger 402, 402' end by contact of the plunger tip 410, 410' to the inside of the barrel or vessel, respectively. The entire system is built on a support 550, including a support for the plate 300. With the reactor plungers 402', each plunger runs through a reactor vessel and has a tip 410' that forms a seal with the inside of the reactor vessel, such that when the reactor plunger 410' is moved backward the volume of the reactor vessel is increased. When the reactor plunger is moved forward, the reactor vessel volume is decreased. The reactor plungers each have a top attached to another plunger plate that moves the plurality of reactor plungers simultaneously, as described above for the header plungers.

To operate the system in FIG. 22, the liquids and gasses are added to the vessels 102 and barrels 202 along with mixing balls or other mixing parts (discussed above) either manually or in an automated fashion. The vessels and barrels are then sealed to the plate 300 and connected to the drive system 500, 500'. The entire system may then be placed on rocking plate or a rotating plate (such as shown in FIG. 19) for mixing during reaction. The sum of reactor and header volume may be kept constant by moving the reactor plunger 402' backward at the same speed that the header plunger 402 is moved forward. In an alternative methodology, this embodiment allows operation at constant available reactor volume by moving only the header plunger 402, as discussed above. Although only a single reactor system is shown in FIG. 22, there can be any number of matched vessels and headers such as discussed above for the constant volume embodiment discussed above. There may be 6, 20, 48 or 96 or more reactor systems in reactor and header blocks, or modular as discussed above.

Figure 23:
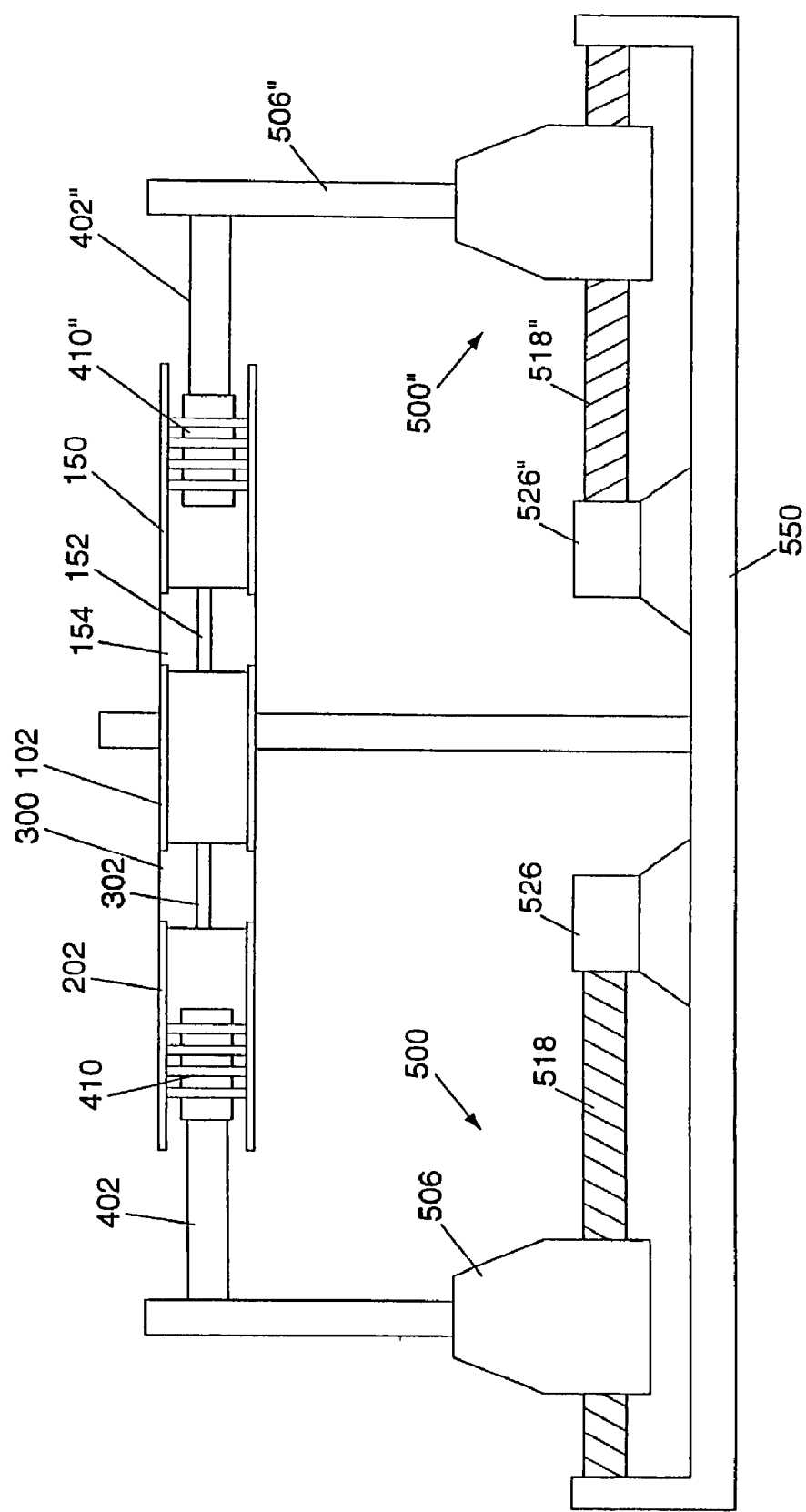
FIG. 23 shows an alternate embodiment of the continuous feed parallel reactor in which a third storage tank is added to the system, allowing materials to be removed from the reactor during or after a reaction.

Another embodiment of this invention is shown in FIG. 23, which shows the embodiment of a continuous reactor system. As shown in FIG. 23, one side of the reactor vessel 102 is connected to the header barrel 202 via a transfer line 302. The reactor vessel 102 is sealed to plate 300. This part of this embodiment works as described in detail above. In addition, a holding tank 150 (also called a storage tank) is connected to other end of the reactor vessel 102 via a second transfer line 152 that is contained in a second plate 154. The various embodiments for the second transfer line and second plate can be any of those discussed above for the plate and transfer line(s). Here, the reactor vessel is constant available volume, while both the header barrel 202 and the holding tank 150 are variable volume, with plungers 402, 402" driven by independent carriages 506, 506". The numbered parts are the same as discussed above for similarly numbered parts. In operation, the contents of the header barrel 202 are pushed into the reactor vessel 102. Once a desired reaction time or other criteria has been met, some of the contents are pulled into the holding tank, which may be filled, with chemicals that quench the reaction. Thus, the residence time in the reaction vessel may be varied to suit a particular type of reaction. The sum of reactor, holding tank and haeder volume may be kept constant by moving the holding tank plunger 402" backward at the same speed that the header barrel plunger 402 is moved forward. For a parallel system (not shown) a plurality of second transfer lines corresponding and sealed to the plurality of reactor vessels is also corresponding and sealed to a plurality of holding tanks. A second transfer means is provided associated the plurality of holding tanks and the second transfer means is adapted to remove at least some of the contents of the plurality of reactor vessels through the second transfer lines into the holding tanks. The second transfer means may be a pump and the second transfer lines may be tubing. Preferably, the second transfer means comprises a plurality of plungers 402", with each plunger running through a holding tank and with each of plunger having a tip 410" that forms a seal with the inside of the holding tank, such that when the plunger is moved backward contents are removed from the reactor vessel through the second transfer line and into the holding tank. As with the header plungers, preferably each plunger has a top that is attached to a second plunger plate, such that all plungers in the plurality move simultaneously when the plunger plate is moved. The second plunger plate is moved by the second drive system 500".

In other alternative embodiments, the reactor and header blocks may be split up into modules, each containing a certain number of wells and vessels for a given number of reactions. The use of modules offers several advantages over a monolithic block. For example, the size of the block can be easily adjusted depending on the number of reactants or the size of the combinatorial library. Also, relatively small modules are easier to handle, transport, and fabricate than a single, large block. A damaged module can be quickly replaced by a spare module, which minimizes repair costs and downtime. Finally, the use of modules improves control over reaction parameters. For instance, the plunger plate of different modules may be driven forward at different rates or the temperature or pressure of each of the vessels can be varied between modules. Multiple header vessels may feed into each reactor vessel, and multiple holding vessels may remove contents from each reactor vessel.

The wells, reactor vessels, header barrels, storage tanks, etc. of this invention can be arranged and/or operated in a combinatorial fashion, that is, in rapid serial and/or parallel fashion, e.g., in a library or array format. In a combinatorial array, each of the plurality of reactor vessels, header barrels, storage tanks, plungers, etc. can be the same or somehow different from the others in the array. Such differences can be compositional (such as having a composition that is different), a processing parameter (such as temperature, pressure, atmosphere composition, etc.) or other differences that those of skill in the art will recognize from a review of this specification. Also, each member in the array is in a different reactor such that each reaction is isolated from the others.

The array or library format typically comprises at least 6 different reactions, e.g., 6 different compositions being reacted or 6 different processing conditions (such as temperature or pressure). In other embodiments, there are at least 25 reactions, in still other embodiments, there are at least 48 or 96 or 124 or more different reactions. Because of the manner of forming combinatorial arrays, it may be that each compound, material or composition is not pure. Similarly, reaction conditions, processes, reactants, catalysts or solvents can be varied in a known manner using one or more arrays of the present invention.

The ability to monitor and control the temperature of individual reactor vessels and/or individual header barrels an important aspect of the present invention. During chemical reactions, temperature can have a profound effect on structure and properties of reaction products. For example, in free radical emulsion polymerization, polymer structure and properties—molecular weight, particle size, glass transition—can be influenced by reaction temperature. During screening or characterization of combinatorial libraries, temperature control and monitoring of library members is often essential to making meaningful comparisons among members. Finally, temperature can be used as a screening criteria or can be used to calculate useful process and product variables. For instance, catalysts of exothermic reactions can be ranked based on peak reaction temperature, and temperature measurements can be used to compute rates of reaction and conversion.

One embodiment of a temperature monitoring and control system, which includes temperature sensors that are in thermal contact with individual vessels 102. Suitable temperature sensors include jacketed or non-jacketed thermocouples (TC), resistance thermometric devices (RTD), and thermistors. The temperature sensors communicate with a temperature monitor, which converts signals received from the temperature sensors to a standard temperature scale. An optional processor receives temperature data from the temperature monitor. The processor performs calculations on the data, which may include wall corrections and simple comparisons between different vessels 102, as well as controlling heaters in closed loop fashion. In the preferred embodiment, a dedicated temperature controller is provided, which communicates to an external computer. Thus, control functions and calculations may be performed in either place.

Depending on the application, each of the vessels and/or barrels can be maintained at the same temperature or at different temperatures during an experiment. For example, one may screen compounds for catalytic activity by first combining, in separate vessels, each of the compounds with common starting materials, and then reacting the mixtures at a uniform temperature. One may then further characterize a promising catalyst by combining it in numerous vessels with the same starting materials used in the screening step. The mixtures are then reacted at different temperatures to gauge the influence of temperature on catalyst performance (speed, selectivity). In many instances, it may be necessary to change the temperature of the vessels during processing. For example, one may decrease the temperature of a mixture undergoing a reversible exothermic reaction to maximize conversion. Or, during a characterization step, one may ramp the temperature of a reaction product to detect phase transitions (melting range, glass transition temperature). Finally, one may maintain the reactor block at a constant temperature, while monitoring temperature changes in the vessels during reaction to obtain calorimetric data.

For clarity, we describe the temperature monitoring and control system with reference to the monolithic reactor block 100 of FIG. 1, but this disclosure applies equally well to the modular reactor block described previously. The temperature monitoring can be done at a convenient location in the reactor block and/or header block as the temperature of both the reaction and the reactant(s) is important to both monitor and control. For example, each of the vessels 102 of the reactor block 100 shown in FIGS. 1 or 3 are equipped with a heating element (such as cartridge heater) that fits into a channel 120 in the reactor block 100. A similar channel 220 is in the header block 200. In other embodiments, each vessel has its own heating element between the vessel 102 and the top of the spring pre-tensioners 106. In still other embodiments, a channel can run through the reactor block and/or header block that carries a heating fluid or cooling fluid, thereby heating or cooling the entire block to a desired temperature. Use of the heating or cooling fluid embodiment with an individual heater for each vessel and/or barrel provides complete control of temperature. Therefore the temperature of each reaction can range from about −100° C. to about 300° C.

To complete the closed loop, temperature monitors are included to monitor the temperature of each vessel and/or barrel, so that the temperature of the vessels 102 or barrels 202 can be controlled independently. Other embodiments include placing the heating element and temperature sensor within the vessel or barrel, which results in more accurate temperature monitoring and control of the contents, and combining the temperature sensor and heating element in a single package. An example of a combined temperature sensor and heater is a thermistor, which can be used for both temperature monitoring and control because its resistance depends on temperature. Many different temperature monitoring and control embodiments are discussed in copending U.S. patent application Ser. No. 09/177,170, filed on Oct. 22, 1998, which is incorporated herein by reference.

Mixing variables such as the addition of mixing balls of various size with respect to the size of the reactor vessels and/or header barrels as well as the rate at which a rocker plate is rocked or a rotating plate is rotated or the composition or, density of the mixing balls may influence the course of a reaction and therefore affect the properties of the reaction products. For example, in connection with stirring bars, stirring blade torque, rotation rate, and geometry, may affect the reaction, as described in copending U.S. patent application Ser. No. 09/177,170, filed on Oct. 22, 1998, which is incorporated herein by reference.

Many different types of reactions can be studied in parallel using the apparatus and methods of this invention, including carbonylation, hydroformylation, hydroxycarbonylation, hydrocarbonylation, hydroesterification, hydrogenation, transfer hydrogenation, hydrosilylation, hydroboration, hydroamination, epoxidation, aziridination, reductive amination, C—H activation, insertion, C—H activation-insertion, C—H activation-substitution, C-halogen activation, C-halogen activation-substitution, C-halogen activation-insertion, cyclopropanation, alkene metathesis, alkyne metathesis and polymerization reactions of all sort, including alkene oligomerization, alkene polymerization, alkyne oligomerization, alkyne polymerization, co-polymerization, CO-alkene co-oligomerization, CO-alkene co-polymerization, CO-alkyne co-oligomerization and CO-alkyne co-polymerization. One preferred reaction for study is polymerization, including coordination polymerizations, cationic polymerizations and free radical polymerizations. Polymerization is a preferred reaction for study in this mechanism and apparatus because of the variety of methods by which a polymerization reaction can be carried out.

As evidenced by the variety of industrially important reactions that may be performed the apparatus and method of this invention, using semi-continuous processes, where one or more reagents is metered into the process reactor at a controlled rate is important. Other processes are conducted in a continuous manner, where reagents are metered into the process reactor at a controlled rate, while products are simultaneously removed from the reactor. It is frequently important to screen candidate catalysts, materials, and processes under realistic process conditions. Many catalytic reactions proceed most favorably when one or more reagents is maintained at a low concentration during the course of the reaction. Semi-continuous and continuous processes allow such conditions to be established, if the rate of reagent is consumed in the reactor at a rate comparable or faster than the rate at which it is introduced. Semi-continuous and continuous processes also allow for efficient use of industrial reactor capacity, since the final concentration of products can be much higher than the instantaneous concentration of starting materials during the course of the reaction. Also, semi-continuous and continuous processes are readily controlled, because the rate of heat release is limited by the rate of reagent addition to the reactor. Semi-continuous and continuous processes can add the reagents more slowly than the rate of reaction, so that the instantaneous concentration of reagents is low throughout the process, but so that the concentration of product from the reactor is high. Reactions that benefit from this mode include cyclization reactions to form medium- and large-sized rings, reactions where one or more of the reagents is prone to unwanted self-reaction or polymerization, and catalytic processes where one or more reagents acts as an inhibitor to the catalyst. Furthermore, semi-continuous or continuous processes may allow for the production of more chemically uniform copolymers because the process can occur with a low concentration of monomer.

Emulsion polymerization processes produce polymer dispersions or colloids, typically of small polymer particles in water stabilized by surfactant. Such colloids are frequently unstable in the presence of organic solvents or molecules, such as monomers. Semi-continuous and continuous process can produce emulsions with the slow addition of monomer, because the monomer concentration is maintained very low during the process. Also, semi-continuous and continuous processes allow unstable, highly reactive reagents, such as thermal initiators, to be metered throughout the course of the process, so that useful concentrations of the reagent is maintained until the reaction is complete.

The above description is intended to be illustrative and not restrictive. Many embodiments as well as many applications will be apparent to those of skill in the art upon reading the above description. The scope of the invention should therefore be determined, not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. An apparatus for effecting a set of semi-continuous or continuous chemical reactions in a parallel semi-continuous or continuous reactor, the apparatus comprising
   a filling station comprising an automated robotic liquid-handling system adapted for loading starting materials into a plurality of reactor vessels of a parallel semi-continuous or continuous reactor, the liquid handling system being controlled by a processor having a software interface for allowing a user to supply operating parameters to the processor, the parallel semi-continuous or continuous reactor comprising (i) the plurality of semi-continuous or continuous sealed, isolated reactor vessels for containing the starting materials, (ii) multiple header barrels for containing liquid reactants, and (iii) a transfer system comprising one or more pumps and multiple transfer lines configured for feeding liquid reactants from each of the multiple header barrels to each of the plurality of sealed, isolated reactor vessels during a reaction, the transfer system being controlled by a processor so that reactants can be fed to the reactor vessels at a desired rate during the reaction, wherein the transfer system of the parallel reactor comprises, for each of the multiple header barrels: (i) a pump, (ii) a feed line providing fluid communication between the header barrel and the pump, and (iii) a transfer line providing selective communication between the pump and each of the plurality of reactor vessels, the transfer line including a valve for serially directing flow into each of the plurality of reactor vessels during a reaction, a temperature monitoring and control system adapted for maintaining the plurality of reactor vessels at the same temperature during the set of reactions and maintaining the plurality of reactor vessels at different temperatures during the set of reactions, and a stirring system for mixing the contents of the reactor vessels during the set of reactions.

2. The apparatus of claim 1 further comprising a reactor vessel handling system for automated robotic handling and transfer of the reactor vessels from the filling station to the parallel reactor.

3. The apparatus of claim 1 wherein the tops of the reactor vessels are held in an array format by the reactor.

4. The apparatus of claim 1 wherein the reactor further comprises a reactor block comprising the plurality of semi-continuous or continuous sealed, isolated reactor vessels for containing starting materials, wherein the reactor vessels are removable and the reaction block comprises a plurality of wells for receiving the plurality of removable vessels.

5. The apparatus of claim 4 further comprising a reactor vessel handling system for automated robotic handling and transfer of the reactor vessels from the filling station to the reaction block.

6. The apparatus of claim 4 wherein the tops of the reactor vessels are held in an array format by the reaction block.

7. The apparatus of claim 1 wherein the operating parameters for the liquid-handling system include initial compositions of starting materials, and coordinates of the reactor vessels.

8. The apparatus of claim 1 wherein the liquid-handling system is further adapted for loading liquid reactants into the multiple header barrels.

9. The apparatus of claim 1 wherein the temperature monitoring and control system is further adapted for maintaining the multiple header barrels at the same temperature during the set of reactions and maintaining the multiple header barrels at different temperatures during the set of reactions.

10. The parallel reactor of claim 1 wherein the plurality of reactors vessels comprises at least six reactor vessels.

11. The parallel reactor of claim 1 wherein the plurality of reactors vessels comprises at least forty-eight reactor vessels.

12. The parallel reactor of claim 1 wherein the plurality of reactors vessels comprises at least ninety-six reactor vessels.

13. The parallel reactor of claim 4 wherein the removable reactor vessels are glass vials.

14. The parallel reactor of claim 1 wherein the stirring system is a mechanical stirring system.

15. The parallel reactor of claim 1 wherein the plurality of reactors vessels comprises at least six reactor vessels arranged in a monolithic reaction block.

16. The parallel reactor of claim 1 wherein the plurality of reactors vessels comprises at least six reactor vessels arranged in a reaction block comprising two or more modules.

17. The apparatus of claim 16 wherein the reactor vessels are removable and the reaction block comprises a plurality of wells for receiving the plurality of removable vessels.

18. An apparatus for effecting a set of semi-continuous or continuous chemical reactions in a parallel semi-continuous or continuous reactor, the apparatus comprising a filling station comprising an automated robotic liquid-handling system adapted for loading starting materials into six or more removable reactor vessels of a parallel semi-continuous or continuous reactor, the liquid handling system being controlled by a processor having a software interface for allowing a user to supply operating parameters to the processor, the parallel semi-continuous or continuous reactor comprising (i) six or more removable, semi-continuous or continuous sealed, isolated reactor vessels for containing the starting materials, the six or more reactor vessels being removably arranged in the reactor, (ii) multiple header barrels for containing liquid reactants, and (iii) a transfer system comprising one or more pumps and multiple transfer lines configured for feeding liquid reactants from each of the multiple header barrels to each of the plurality of sealed, isolated reactor vessels during a reaction, the transfer system being controlled by a processor so that reactants can be fed to the reactor vessels at a desired rate during the reaction, wherein the transfer system of the parallel reactor comprises, for each of the multiple header barrels: (i) a pump, (ii) a feed line providing fluid communication between the header barrel and the pump, and (iii) a transfer line providing selective communication between the pump and each of the plurality of reactor vessels, the transfer line including a valve for serially directing flow into each of the plurality of reactor vessels during a reaction, a reactor vessel handling system for automated robotic handling and transfer of the six or more reactor vessels from the filling station to the parallel reactor, a temperature monitoring and control system adapted for maintaining the six or more reactor vessels at the same temperature during the set of reactions and maintaining the six or more reactor vessels at different temperatures during the set of reactions, and a mechanical stirring system for mixing the contents of the reactor vessels during the set of reactions.

* * * * *